US012693702B2

(12) United States Patent
Niu et al.

(10) Patent No.: US 12,693,702 B2
(45) Date of Patent: Jul. 28, 2026

(54) FOLDABLE APPARATUS AND ELECTRONIC DEVICE

(71) Applicant: Huawei Technologies Co., Ltd., Shenzhen (CN)

(72) Inventors: Linhui Niu, Shanghai (CN); Wenjie Jiang, Xi'an (CN); Zhengyi Xu, Shanghai (CN); Cong Xi, Shanghai (CN); Delong Zhu, Shanghai (CN); Yongwei Pan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 18/891,692

(22) Filed: Sep. 20, 2024

(65) Prior Publication Data

US 2025/0013260 A1 Jan. 9, 2025

Related U.S. Application Data

(63) Continuation of application No. PCT/CN2023/082467, filed on Mar. 20, 2023.

(30) Foreign Application Priority Data

Mar. 24, 2022 (CN) .......................... 202210298837.3

(51) Int. Cl.
  *G06F 1/16* (2006.01)
  *F16C 11/04* (2006.01)
(52) U.S. Cl.
  CPC .......... *G06F 1/1616* (2013.01); *F16C 11/045* (2013.01); *G06F 1/1624* (2013.01); *G06F 1/1681* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 10,831,243 B2 * | 11/2020 | Kim | ...................... | G06F 1/1652 |
| 11,336,759 B2 * | 5/2022 | Liao | ...................... | H04M 1/022 |
| 11,467,633 B2 * | 10/2022 | Liao | ...................... | G06F 1/1641 |
| 11,473,356 B1 * | 10/2022 | Hsu | ......................... | E05D 3/122 |
| 11,914,433 B2 * | 2/2024 | Liao | ...................... | H04M 1/0268 |
| 11,933,351 B2 * | 3/2024 | Jiang | ...................... | F16C 11/04 |
| 12,108,551 B2 * | 10/2024 | Jung | ................... | H04M 1/022 |
| 12,164,345 B2 * | 12/2024 | Zhang | ................... | G06F 1/1681 |
| 12,277,005 B2 * | 4/2025 | Li | .......................... | G06F 1/1616 |
| 12,332,703 B2 * | 6/2025 | Liao | ......................... | F16C 11/04 |
| 12,425,500 B2 * | 9/2025 | Xu | ...................... | H04M 1/0216 |
| 12,483,642 B2 * | 11/2025 | Liu | ......................... | H04M 1/18 |

(Continued)

FOREIGN PATENT DOCUMENTS

| | | |
|---|---|---|
| CN | 113225412 A | 8/2021 |
| CN | 113404770 A | 9/2021 |

*Primary Examiner* — Lisa Lea-Edmonds
(74) *Attorney, Agent, or Firm* — Slater Matsil, LLP

(57) ABSTRACT

In accordance with an embodiment, a foldable apparatus includes a first shielding plate and a second shielding plate; when the foldable apparatus is in an unfolded state, the first shielding plate and the second shielding plate are configured to be interconnected; and when the foldable apparatus is in a folded state, the first shielding plate and the second shielding plate are configured to be disposed between a first mounting plate and a second mounting plate in a stacked manner.

20 Claims, 20 Drawing Sheets

(56)　　　　　　References Cited

U.S. PATENT DOCUMENTS

| 2020/0233466 | A1 | 7/2020 | Sanchez et al. | |
| 2021/0181808 | A1* | 6/2021 | Liao | H04M 1/0216 |
| 2021/0368032 | A1* | 11/2021 | Liao | G06F 1/1681 |
| 2022/0182476 | A1* | 6/2022 | Cha | H04M 1/0216 |
| 2023/0054923 | A1* | 2/2023 | Liao | G06F 1/1681 |
| 2023/0171334 | A1* | 6/2023 | Xu | H04M 1/022 |
| | | | | 455/566 |
| 2023/0229189 | A1* | 7/2023 | Li | G06F 1/1616 |
| 2023/0403347 | A1* | 12/2023 | Liu | G06F 1/1681 |
| 2024/0023260 | A1 | 1/2024 | Feng | |
| 2024/0160253 | A1* | 5/2024 | Liao | H04M 1/0268 |
| 2024/0396986 | A1* | 11/2024 | Guan | G06F 1/1652 |
| 2025/0013260 | A1* | 1/2025 | Niu | G06F 1/1624 |

* cited by examiner

FOLDABLE APPARATUS AND ELECTRONIC DEVICE

CROSS-REFERENCE TO RELATED APPLICATIONS

This application is a continuation of International Application No. PCT/CN2023/082467, filed Mar. 20, 2023, which claims priority to Chinese Patent Application No. 202210298837.3, filed Mar. 24, 2022. The disclosures of the aforementioned applications are hereby incorporated by reference in their entireties.

TECHNICAL FIELD

This application relates to an electronic device having a flexible display, and in particular, to a foldable apparatus and an electronic device.

BACKGROUND

With development of a flexible display technology, a foldable apparatus based on a flexible display becomes a new technological innovation in the current industry. An outward folding solution for the foldable apparatus is defined as follows: two main bodies are rotatably connected through a hinge, so that the two main bodies can be folded or unfolded relative to each other. In a folded state, the flexible display is located on outer surfaces of the two main bodies folded relative to each other, and rear housings of the two main bodies are disposed face to face or are in contact with each other. For the foldable apparatus in the outward folding solution, shielding plates need to be disposed. In an unfolded state, the shielding plates are located between the rear housings of the two main bodies and shields the hinge of the foldable apparatus. For a related structural design of the shielding plate of the foldable apparatus, to save space of an electronic device while meeting a function of the shielding plate is a research and development trend in the industry.

SUMMARY

Embodiments of this application provide a foldable apparatus and an electronic device.

According to a first aspect, an embodiment of this application provides a foldable apparatus, including a first mounting plate, a second mounting plate, a hinge, a first shielding plate, a second shielding plate, a first rotating arm, and a second rotating arm. The hinge is rotatably connected to the first mounting plate and forms a first axis, and the hinge is rotatably connected to the second mounting plate and forms a second axis. Specifically, a rotation center at a rotation joint between the hinge and the first mounting plate is the first axis. The first shielding plate is slidably connected to the first mounting plate, and the first rotating arm is rotatably connected to the hinge and forms a third axis. Specifically, a rotation center at a rotation joint between the first rotating arm and the hinge is the third axis, and the third axis and the first axis are non-collinear. That the first shielding plate is movably connected to the first rotating arm may be understood as the following: There is a degree of freedom at a joint between the first shielding plate and the first rotating arm, so that in a process in which the first rotating arm rotates relative to the hinge, the first shielding plate can be pushed to slide relative to the first mounting plate. The second shielding plate is slidably connected to the second mounting plate, and the second rotating arm is rotatably connected to the hinge and forms a fourth axis. Specifically, a rotation center at a rotation joint between the second rotating arm and the hinge is the fourth axis, and the fourth axis and the second axis are non-collinear. That the second shielding plate is movably connected to the second rotating arm may be understood as the following: There is a degree of freedom at a joint between the first shielding plate and the first rotating arm, so that in a process in which the second rotating arm rotates relative to the hinge, the second shielding plate can be pushed to slide relative to the second mounting plate.

When the foldable apparatus is in an unfolded state, the first shielding plate and the second shielding plate are interconnected and jointly form an appearance part configured to shield the hinge. When the foldable apparatus is in a folded state, the first shielding plate and the second shielding plate are disposed between the first mounting plate and the second mounting plate in a stacked manner.

In this embodiment of this application, positions of the first axis, the second axis, the third axis, and the fourth axis are set, so that the first shielding plate and the second shielding plate of the foldable apparatus can be smoothly opened and closed. In addition, a small size in a width direction and thinning in a thickness direction can be implemented. Specifically, the positions of the first axis and the second axis may determine motion tracks of the first mounting plate and the second mounting plate in an unfolding process and a folding process. In the thickness direction of the electronic device, if the first axis and the second axis are limited to inner sides (that is, inner surfaces of the two shielding plates or between an inner surface of each of the two shielding plates and the hinge or on the hinge) of the first shielding plate and the second shielding plate, a first rotating assembly can have a small size. If the first axis and the second axis are limited to outer sides (that is, outer surfaces of the two shielding plates or in space on sides that are of the outer surfaces of the two shielding plates and that are away from the inner surfaces) of the first shielding plate and the second shielding plate, the first rotating assembly has a large size in the width direction, and occupies large space in the electronic device. Therefore, in this embodiment of this application, the first axis and the third axis are non-collinear, and the second axis and the fourth axis are non-collinear, so that a slidable connection structure between each of the two shielding plates and each of the two mounting plates can be limited within an ideal range in the width direction, and a design of miniaturization of the electronic device is implemented.

In a possible implementation, the first shielding plate includes a first inner surface and a first outer surface that are disposed opposite to each other, the first inner surface faces the first rotating arm, and the third axis is located on the first outer surface or on a side that is of the first outer surface and that is away from the first inner surface. Similarly, the fourth axis may also be located on a side of the outer surface of the second shielding plate. In this application, each of the third axis and the fourth axis is disposed on a side of the outer surface of each of the first shielding plate and the second shielding plate, so that a small size in the thickness direction can be met. In addition, the first shielding plate and the second shielding plate do not interfere with the hinge.

In a possible implementation, the first rotating arm is rotatably connected to the first shielding plate. In this application, a degree of freedom at the joint between the first shielding plate and the first rotating arm is designed, so that relative positions between the first shielding plate and the first mounting plate can be adjusted in a process in which the first rotating arm rotates relative to the hinge. In this solution, the degree of freedom is designed in a rotating connection manner, and this has the advantages of space saving and connection reliability.

In another implementation, the first shielding plate may alternatively be movably connected to the first rotating arm in another manner, for example, may be slidably connected to the first rotating arm. The first shielding plate may be slidably connected to the first rotating arm through fitting between a sliding groove and a sliding block. Provided that a movement track of the sliding block in the sliding groove is limited, positions of the first shielding plate and the first rotating arm can be adjusted. In addition, in a position adjustment process, the first rotating arm may generate pushing force on the first shielding plate, so that a sliding speed of the first shielding plate relative to the first mounting plate increases.

In a possible implementation, the first rotating arm includes a first arc-shaped arm, the first arc-shaped arm fits the hinge for a rotating connection between the first rotating arm and the hinge, and the third axis is an arc center of the first arc-shaped arm. This solution provides a specific solution for the rotating connection between the first rotating arm and the hinge. A structure is simple, and a stable and reliable movement track can be provided.

In a possible implementation, the foldable apparatus further includes a first sliding block, where the first shielding plate is slidably connected to the first mounting plate through the first sliding block, the first shielding plate is rotatably connected to the first rotating arm through the first sliding block, and the first shielding plate and the first sliding block are in a detachable connection relationship. In this solution, the first sliding block is disposed as a structure for connecting the first shielding plate to the first mounting plate and the first rotating arm. A detachable connection design enables the first shielding plate to be easily replaced.

In a possible implementation, the foldable apparatus further includes a first fastening plate, the first fastening plate is fastened to the sliding block, and the first shielding plate and the first fastening plate are in a detachable connection relationship. An area of a surface that is of the first fastening plate and that is connected to the first shielding plate is greater than an area of a surface that is of the first sliding block and that faces the first shielding plate. In this solution, the first fastening plate is disposed between the first sliding block and the first shielding plate, so that connection stability and reliability of the first shielding plate can be ensured.

In a possible implementation, the first fastening plate is connected to the first shielding plate through magnetic attraction force, and when the foldable apparatus is in the unfolded state, the first shielding plate and the second shielding plate are interconnected through magnetic attraction force. When the foldable apparatus is in the unfolded state, the first shielding plate and the second shielding plate are seamlessly spliced through the magnetic attraction force. In this way, it can be ensured that there is no seam at a joint between the first shielding plate and the second shielding plate in the unfolded state, and appearance integrity of the electronic device and user experience are improved.

In a possible implementation, the first sliding block includes a sliding fitting portion, a shielding plate fastening portion, and a rotating connection portion. The sliding fitting portion is configured to slidably fit the first mounting plate, and the sliding fitting portion is in a flat plate shape. Specifically, the sliding fitting portion is parallel to the first shielding plate. Parallelism defined in this application is not limited to absolute parallelism. The defined parallelism may be understood as basic parallelism, and cases of non-absolute parallelism caused by factors such as an assembly tolerance and a structural flatness are allowed. In these cases, the sliding fitting portion and the first shielding plate are not absolutely parallel. However, in this application, the sliding fitting portion and the first shielding plate in these cases are also defined as being parallel. In this solution, the sliding fitting portion is designed to be in the flat plate shape, so that sliding fitting between the first sliding block and the first mounting plate is simple. This facilitates processing and assembly, and can also ensure that the first mounting plate and the first shielding plate have stable and reliable motion tracks.

In a possible implementation, when the foldable apparatus is in the folded state, the first shielding plate and the second shielding plate are disposed in a stacked manner, and at least a part of a rear housing of the electronic device is accommodated in space between the first shielding plate and the second shielding plate. That is, the space between the first shielding plate and the second shielding plate is used to accommodate the rear housing of the electronic device. It may be understood as the following: In the folded state, first shielding plate moves to a side of an inner surface of a first rear housing, the second shielding plate moves to a side of an inner surface of a second rear housing, an outer surface of the first rear housing and an outer surface of the second rear housing are disposed opposite to each other, and a gap may be disposed between the outer surface of the first rear housing and the outer surface of the second rear housing, or the outer surface of the first rear housing and the outer surface of the second rear housing may be in contact with each other. The first shielding plate and the second shielding plate of the foldable apparatus provided in this solution occupy internal space of the first rear housing and the second rear housing. This helps implement a design of a small size of the foldable apparatus in the thickness direction.

In a possible implementation, the first shielding plate includes a first part and a second part that are adjacent to each other. When the foldable apparatus is in an intermediate state, where the intermediate state is a state presented in a process of switching between the unfolded state and the folded state, the first part is located on a side of an inner surface of the rear housing, the second part is correspondingly disposed on an outer side of a side edge of the rear housing, the first part is shielded by the rear housing of the electronic device, the second part is exposed as an appearance part of the electronic device, the first part includes a first main body and a first protrusion, and the first protrusion protrudes from a surface of the first main body and is in contact with the rear housing, so that a gap is formed between the first main body and the rear housing, and the second part is connected to the first main body. When the foldable apparatus is in the folded state, the second part is located on a side of the inner surface of the rear housing, and a gap is formed between the second part and the rear housing. In this solution, the first protrusion is in contact with the first rear housing, and gaps are formed between the second part of the first shielding plate and the first rear housing and between a part, other than the first protrusion, of the first part of the first shielding plate and the first rear housing. This solution helps reduce an area of a friction interface between an outer surface of the first shielding plate and the inner surface of the first rear housing. For the first shielding plate, the outer surface of the first shielding plate in the unfolded state may still maintain a gap with the first rear housing in a folding process, and there is no friction between the outer surface of the first shielding plate and the first rear housing, so that an appearance surface of the first shielding plate can be prevented from being worn out.

In a possible implementation, a groove is disposed at a joint between the first main body and the first protrusion, and an adhesive material is disposed on an inner wall of the groove. Friction between the first protrusion and the first rear housing easily leads to scraps. The groove is used to accommodate the scraps, and the adhesive material is used to adsorb the scraps, to prevent a case in which user experience is affected because of the scraps scattering in another position of the electronic device.

In a possible implementation, the first shielding plate includes a first part and a second part that are adjacent to each other. When the foldable apparatus is in an intermediate state, where the intermediate state is a state presented in a process of switching between the unfolded state and the folded state, the first part is in contact with an inner surface of the rear housing of the electronic device, and the second part is located on an outer side of a side edge of the rear housing, that is, the second part is in an exposed state, and is used as an appearance part of the electronic device. When the foldable apparatus is in the folded state, both the first part and the second part are in contact with the inner surface of the rear housing, and a friction coefficient between the second part and the rear housing is less than a preset value. It may be understood as the following: In this implementation, a low friction coefficient between the first shielding plate and the first rear housing is limited, so that friction between contact surfaces between the first shielding plate and the first rear housing generates no obvious scratch in a process of opening and closing the foldable apparatus. In addition, the first shielding plate moves more smoothly relative to the first rear housing. Specifically, a lubricating material layer may be disposed on a surface of the first shielding plate. For example, the lubricating material layer is formed by spraying a polytetrafluoroethylene material, or the lubricating material layer may be disposed on the inner surface of the first rear housing, so that a friction coefficient between the first shielding plate and the first rear housing is less than the preset value. This solution helps implement a small size of the foldable apparatus in the thickness direction.

In a possible implementation, the first shielding plate includes a first side surface and a first inclined surface. The first side surface is interconnected to the second shielding plate, the first inclined surface is connected between the first side surface and a first inner surface of the first shielding plate, and the first inclined surface is configured to avoid the hinge. When the foldable apparatus is in the unfolded state, a distance between the first inclined surface and the hinge is greater than a distance between the first inner surface and the hinge. In this solution, a problem of interference between the first shielding plate and the hinge in a process of opening and closing the foldable apparatus is resolved by using the first inclined surface, so that a gap between the first shielding plate and the hinge can be smaller. This facilitates a thinning design of the electronic device.

According to a second aspect, this application provides an electronic device, including a flexible display, a rear housing, and the foldable apparatus according to any one of the possible implementations of the first aspect. The flexible display and the rear housing are separately assembled on two opposite sides of the foldable apparatus. In a folded state, the flexible display is located on an outer side of the foldable apparatus. The electronic device provided in this application has advantages of a small size and thinness because of having the foldable apparatus according to the first aspect.

According to a third aspect, this application provides an electronic device, including a flexible display, a rear housing, and a foldable apparatus. The flexible display and the rear housing are separately assembled on two opposite sides of the foldable apparatus, and the foldable apparatus includes:

a first mounting plate, a second mounting plate, and a hinge, where the hinge is rotatably connected to the first mounting plate, a central axis around which the hinge and the first mounting plate rotate relative to each other is a first axis, the hinge is rotatably connected to the second mounting plate, and a central axis around which the hinge and the second mounting plate rotate relative to each other is a second axis;

a first shielding plate and a first rotating arm, where the first shielding plate is slidably connected to the first mounting plate, the first rotating arm is rotatably connected to the hinge, a central axis around which the first rotating arm and the hinge rotate relative to each other is a third axis, the third axis and the first axis are non-collinear, the first shielding plate is movably connected to the first rotating arm, and in a process in which the first rotating arm rotates relative to the hinge, the first shielding plate slides relative to the first mounting plate; and a second shielding plate and a second rotating arm, where the second shielding plate is slidably connected to the second mounting plate, the second rotating arm is rotatably connected to the hinge, a central axis around which the second rotating arm and the hinge rotate relative to each other is a fourth axis, the fourth axis and the second axis are non-collinear, the second shielding plate is movably connected to the second rotating arm, and in a process in which the second rotating arm rotates relative to the hinge, the second shielding plate slides relative to the second mounting plate, where when the foldable apparatus is in an unfolded state, the first shielding plate and the second shielding plate are interconnected; and when the foldable apparatus is in a folded state, the first shielding plate and the second shielding plate are disposed between the first mounting plate and the second mounting plate in a stacked manner, and the flexible display is located on an outer side of the foldable apparatus.

DETAILED DESCRIPTION OF ILLUSTRATIVE EMBODIMENTS

Terms Explanation

Figure 1:
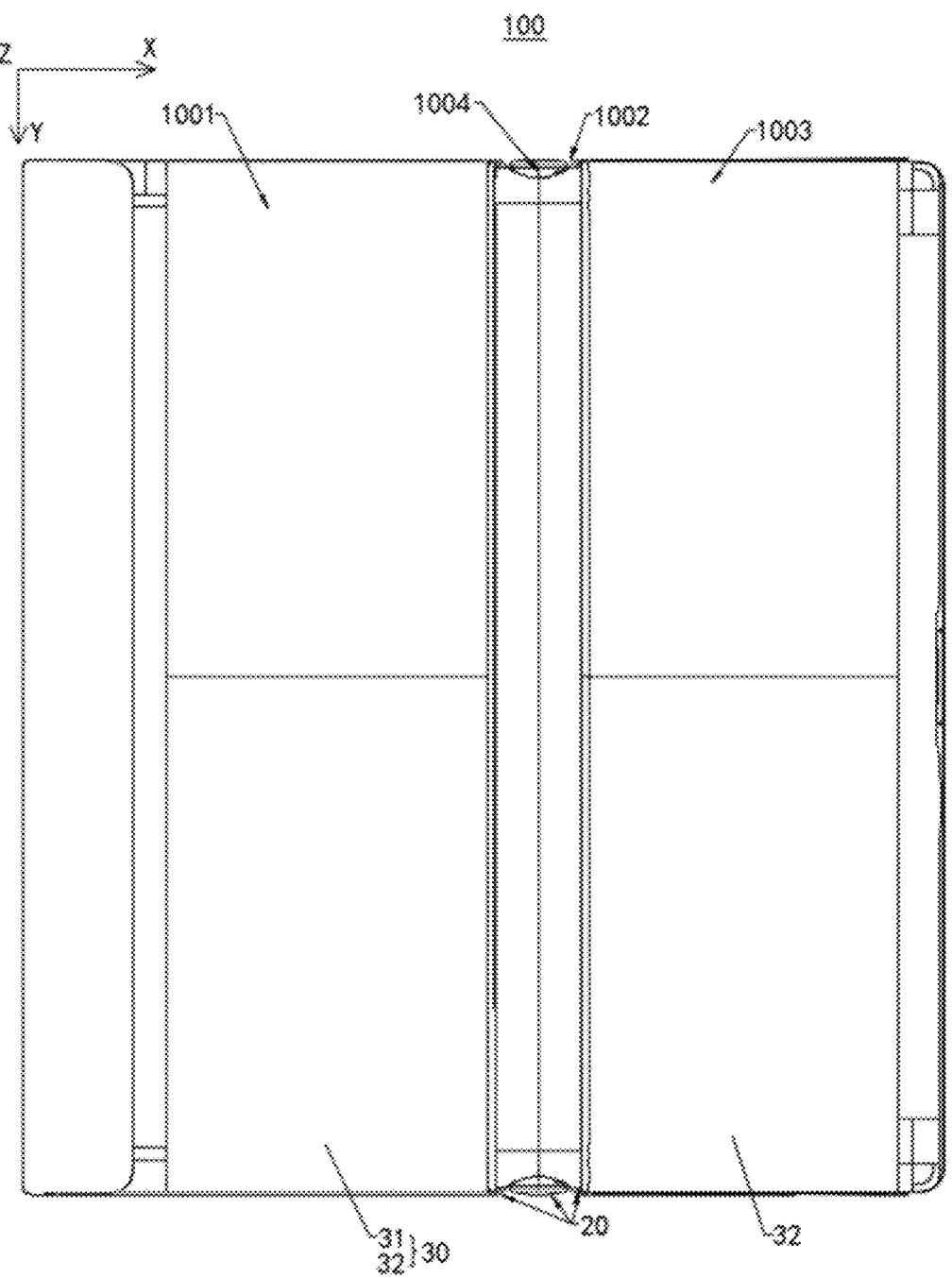
FIG. 1 is a diagram of a structure of an electronic device in an unfolded state according to a specific embodiment of this application.

Parallelism: The parallelism defined in this application is not limited to absolute parallelism. The defined parallelism may be understood as basic parallelism, and cases of non-absolute parallelism caused by factors such as an assembly tolerance, a design tolerance, and a structural flatness are allowed. In these cases, a sliding fitting portion and a first shielding plate are not absolutely parallel. However, in this application, the sliding fitting portion and the first shielding plate in these cases are also defined as being parallel.

Verticality: The verticality defined in this application is not limited to an absolute vertical intersection (in which an included angle is 90 degrees) relationship, a non-absolute vertical intersection relationship caused by factors such as an assembly tolerance, a design tolerance, and a structural flatness is allowed, and an error within a small angle range is allowed. For example, a relationship within an assembly error range of 80 degrees to 100 degrees may be understood as the vertical relationship.

Unfolded state: The unfolded state may be understood as a state in which an included angle between a first planar region and a second planar region of an electronic device is close to 180 degrees. An included angle relationship between the first planar region and the second planar region is not limited to absolute 180 degrees, and a case in which the included angle between the first planar region and the second planar region is not equal to 180 degrees because of factors such as an assembly tolerance, a design tolerance, and a structural flatness is allowed. For example, the included angle may be an angle greater than 180 degrees, for example, 183 degrees, or may be an angle less than 180 degrees, for example, 178 degrees.

Folded state: The folded state may be understood as a state in which the first planar region and the second planar region of the electronic device are in a nearly parallel stacking relationship, and are not limited to being in an absolute parallel relationship. Refer to the foregoing definition of the parallelism.

The following describes embodiments of this application with reference to the accompanying drawings in embodiments of this application.

Embodiments of this application provide a foldable apparatus and an electronic device. The electronic device includes the foldable apparatus, a flexible display fastened to the foldable apparatus, and a rear housing. The rear housing and the flexible display are disposed opposite to each other. The flexible display and the rear housing are respectively two appearance surfaces of the electronic device. The flexible display is fastened to a front surface of the foldable apparatus, and the rear housing is fastened to a rear surface of the foldable apparatus. The foldable apparatus may be unfolded to be in an unfolded state, or may be folded to be in a closed state, or may be in an intermediate state between the unfolded state and the closed state. The foldable apparatus includes two shielding plates. In a process in which the foldable apparatus is unfolded and folded, the two shielding plates move with the foldable apparatus. The shielding plates are configured to shield a hinge at a middle position of the rear housing when the foldable apparatus is in the unfolded state, and the shielding plates are disposed in an overlapping manner with the rear housing when the foldable apparatus is in the folded state. Embodiments of this application provide a specific shielding plate drive structure and a shielding plate structure, so that the foldable apparatus saves space and can provide a stable and reliable shielding plate movement track.

Figure 2:
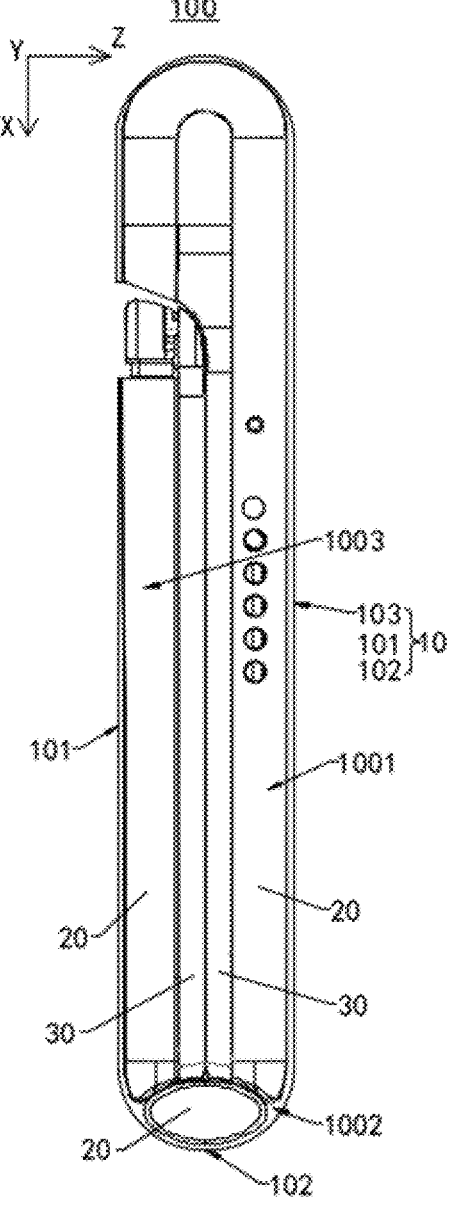
FIG. 2 is a diagram of a structure of the electronic device shown in FIG. 1 in a folded state.

Refer to both FIG. 1 and FIG. 2. FIG. 1 is a diagram of a structure of an electronic device 100 in an unfolded state according to a specific embodiment of this application; and FIG. 2 is a diagram of a structure of the electronic device 100 shown in FIG. 1 in a folded state. An example in which the electronic device 100 shown in FIG. 1 is a mobile phone is used for description. The electronic device 100 includes a first planar region 1001, a bending region 1002, and a second planar region 1003 that are sequentially connected. The bending region 1002 can deform, to enable the first planar region 1001 to unfold or fold relative to the second planar region 1003. As shown in FIG. 1, the first planar region 1001 is unfolded relative to the second planar region 1003, and the electronic device 100 is in the unfolded state. As shown in FIG. 2, the second planar region 1003 is folded relative to the second planar region 1003, and the electronic device 100 is in the folded state. When the bending region 1002 deforms, the first planar region 1001 and the second planar region 1003 can rotate around a rotating axis 1004 (refer to FIG. 1) of the bending region 1002. A width direction X of the electronic device 100 is defined as being perpendicular to the rotating axis 1004 of the bending region 1002, a length direction Y of the electronic device 100 is defined as being parallel to the rotating axis 1004 of the bending region 1002, and a thickness direction Z of the electronic device 100 is defined as being perpendicular to the width direction X and the length direction Y of the electronic device 100. Both FIG. 1 and FIG. 2 are planar views. The thickness direction Z in FIG. 1 is a direction perpendicular to a paper surface, and the length direction Y in FIG. 2 is a direction perpendicular to the paper surface.

Refer to FIG. 1 and FIG. 2. The electronic device 100 includes a flexible display 10, a foldable apparatus 20, and a rear housing 30. The flexible display 10 is mounted on one side of the foldable apparatus 20, and the rear housing 30 is mounted on the other side of the foldable apparatus 20. Specifically, when the electronic device 100 is in the unfolded state, the foldable apparatus 20 forms a flat-plate architecture, and the flexible display 10 and the rear housing 30 are respectively assembled to a front surface and a rear surface of the foldable apparatus 20. When the electronic device 100 is in the folded state, the flexible display 10 is located on an outer surface of the foldable apparatus 20 (the flexible display 10 surrounds the foldable apparatus 20), and the rear housing 30 is sandwiched by the foldable apparatus 20. FIG. 1 shows a planar view of the electronic device 100, and shows a surface of the rear housing 30. The rear housing 30 includes a first rear housing 31 and a second rear housing 32. In the unfolded state, the first rear housing 31 and the second rear housing 32 are connected through a first shielding plate 20A and a second shielding plate 20B of the foldable apparatus 20, where the first shielding plate 20A and the second shielding plate 20B are appearance parts of the electronic device.

The flexible display 10 is configured to display an image, a video, and the like. The flexible display 10 can be bent. Two parts of the foldable apparatus 20 can rotate relative to each other, to drive the flexible display 10 to fold or unfold. The electronic device 100 is of an outward foldable screen structure. As shown in FIG. 2, when the electronic device 100 is in the folded state, the flexible display 10 is located on an outer side of the foldable apparatus 20, and is exposed on an outer side of the electronic device 100. A user can touch the flexible display 10 when the electronic device 100 is in the folded state. The flexible display 10 includes a first straight part 101, a curved part 102, and a second straight part 103. The curved part 102 of the flexible display 10 is connected between the first straight part 101 of the flexible display 10 and the second straight part 103 of the flexible display 10. The first straight part 101 of the flexible display 10 is located in the first planar region 1001. The curved part 102 of the flexible display 10 is located in the bending region 1002. The second straight part 103 of the flexible display 10 is located in the second planar region 1003. As shown in FIG. 1, when the electronic device 100 is in the unfolded state, the first straight part 101, the curved part 102, and the second straight part 103 of the flexible display 10 may be simultaneously displayed, to implement large-screen displaying and improve viewing experience of the user. As shown in FIG. 2, when the electronic device 100 is in the folded state, a size of the electronic device 100 is reduced in the width direction X of the electronic device 100, so that it is convenient to store and carry the electronic device 100. In this case, one or more of the first straight part 101 of the flexible display 10, the curved part 102 of the flexible display 10, and the second straight part 103 of the flexible display 10 can perform displaying. For example, the curved part 102 of the flexible display 10 performs displaying, to implement side displaying of the electronic device 100. The first straight part 101 of the flexible display 10 or the second straight part 103 of the flexible display 10 performs displaying, to implement single-side displaying of the electronic device 100. The flexible display 10 may integrate a touch control function. The electronic device 100 may wake up a corresponding part of the flexible display 10 in response to a gesture of touching the flexible display 10 by the user.

For example, the flexible display 10 may be an organic light-emitting diode (OLED) display, an active-matrix organic light-emitting diode (AMOLED) display, a mini organic light-emitting diode display, a micro light-emitting diode display, a micro organic light-emitting diode display, a quantum dot light-emitting diode (QLED) display, or the like.

Figure 3A:
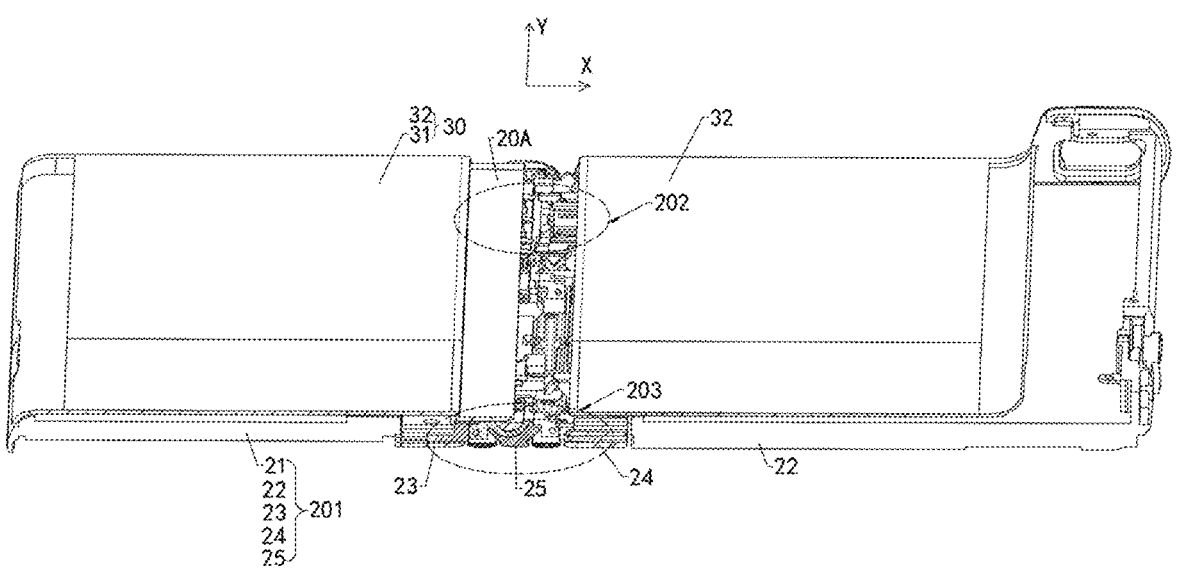
FIG. 3A is a three-dimensional cross-sectional view in which a foldable apparatus and a rear housing of an electronic device are assembled together according to an implementation of this application, where a second shielding plate of the foldable apparatus is omitted in FIG. 3A.
Figure 3B:
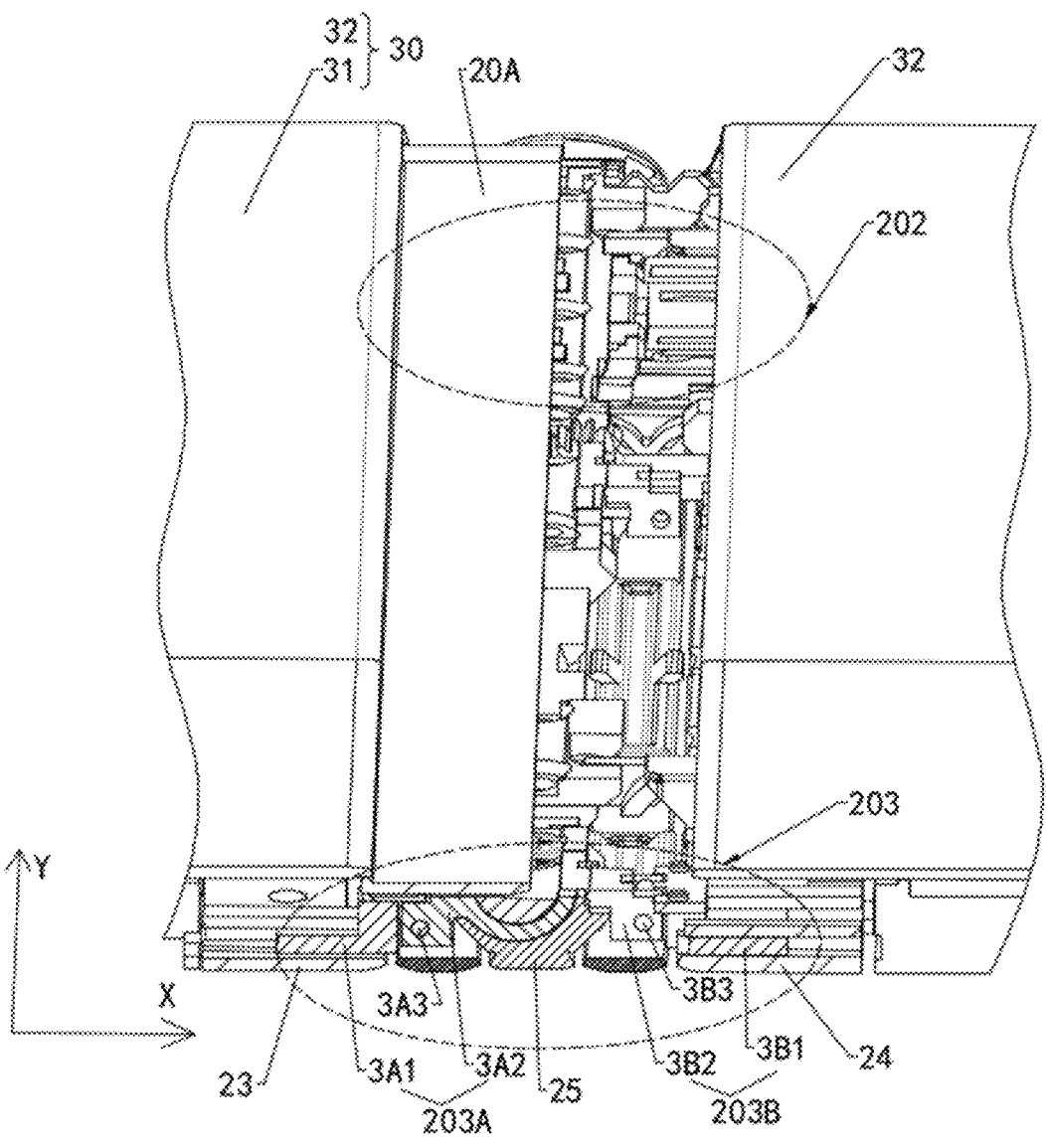
FIG. 3B is a partially enlarged view of FIG. 3A.
Figure 4A:
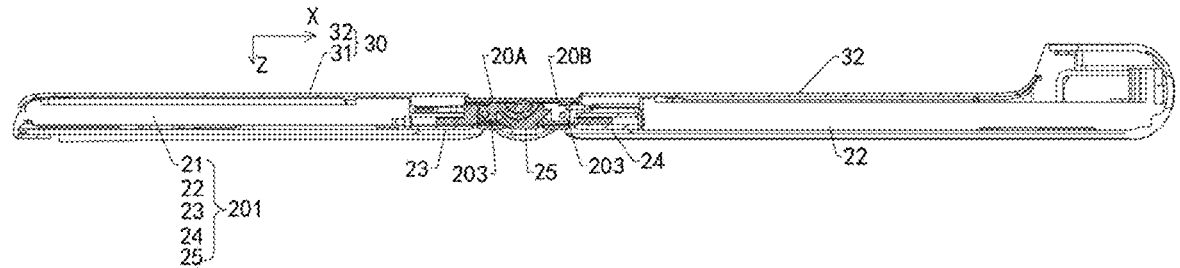
FIG. 4A is a planar cross-sectional view in which a foldable apparatus and a rear housing of an electronic device are assembled together according to an implementation of this application.
Figure 4B:
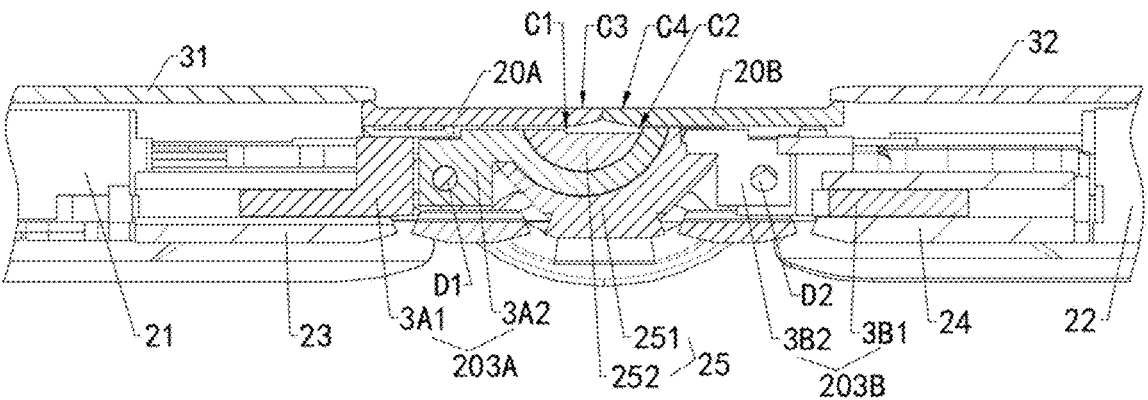
FIG. 4B is a partially enlarged view of FIG. 4A.

FIG. 3A is a three-dimensional cross-sectional view in which a foldable apparatus 20 and a rear housing 30 of an electronic device are assembled together according to an implementation of this application. To clearly express a feature of a hinge of the foldable apparatus, a second shielding plate of the foldable apparatus 20 is omitted in FIG. 3A. FIG. 3B is a partially enlarged view of FIG. 3A. FIG. 4A is a planar cross-sectional view in which a foldable apparatus 20 and a rear housing 30 of an electronic device are assembled together according to an implementation of this application. FIG. 4B is a partially enlarged view of FIG. 4A.

Refer to FIG. 3A, FIG. 3B, FIG. 4A, and FIG. 4B. The foldable apparatus 20 includes a frame assembly 201, a first rotating assembly 202, and a second rotating assembly 203. The frame assembly 201 includes a first middle frame 21, a second middle frame 22, a first mounting plate 23, a second mounting plate 24, and a hinge 25. An extension direction of the hinge 25 is the length direction Y of the electronic device 100. The first mounting plate 23 and the second mounting plate 24 are respectively disposed on two sides of the hinge 25 in the width direction X. The first middle frame 21 is fastened to the first mounting plate 23, and the first middle frame 21 is located on a side that is of the first mounting plate 23 and that is away from the hinge 25. The second middle frame 22 is fastened to the second mounting plate 24, and the second middle frame 22 is located on a side that is of the second mounting plate 24 and that is away from the hinge 25. To be specific, the first middle frame 21, the first mounting plate 23, the hinge 25, the second mounting plate 24, and the second middle frame 22 are sequentially arranged in the width direction X of the electronic device 100. The first middle frame 21 and the second middle frame 22 are configured to assemble the flexible display 10, a battery in the electronic device 100, or another electronic component (for example, a camera module, an audio module, or an antenna module) in the electronic device 100.

The first mounting plate 23 is rotatably connected to the hinge 25 through the first rotating assembly 202, and the second mounting plate 24 is also rotatably connected to the hinge 25 through the first rotating assembly 202. Therefore, the first middle frame 21 and the second middle frame 22 can be folded or unfolded relative to each other, and the foldable apparatus 20 can switch between an unfolded state and a folded state. In FIG. 3A, an elliptical dashed-line box is used to schematically show a position of the first rotating assembly 202, and does not represent a specific detailed structure of the first rotating assembly 202. The detailed structure of the first rotating assembly 202 is described in detail in the following. The second rotating assembly 203 is configured to assemble the first shielding plate 20A and the second shielding plate 20B to the frame assembly 201. The second rotating assembly 203 is configured to: slidably connect the first shielding plate 20A to the first mounting plate 23, and rotatably connect the first shielding plate 20A to the hinge 25. The second rotating assembly 203 is configured to: slidably connect the second shielding plate 20B to the second mounting plate 24, and rotatably connect the second shielding plate 20B to the hinge 25. In FIG. 3A, an elliptical dashed-line box is used to schematically show a position of the second rotating assembly 203, and does not represent a specific detailed structure of the second rotating assembly 203. The detailed structure of the second rotating assembly 203 is described in detail in the following.

Figure 5:
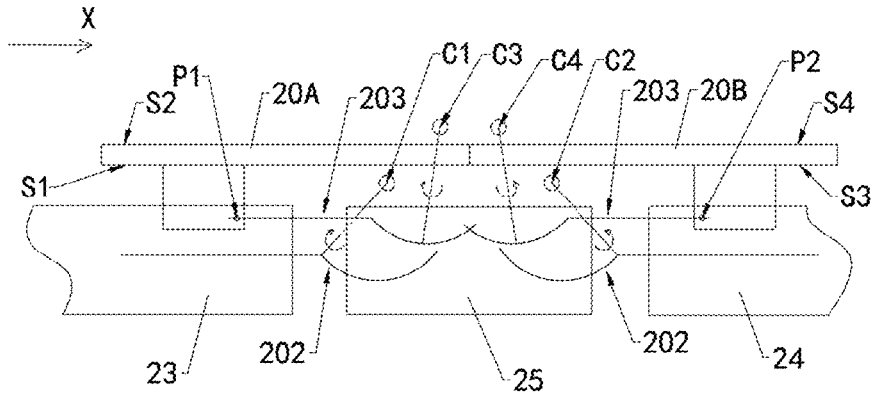
FIG. 5 is a diagram of a foldable apparatus in an unfolded state according to an implementation of this application.
Figure 6:
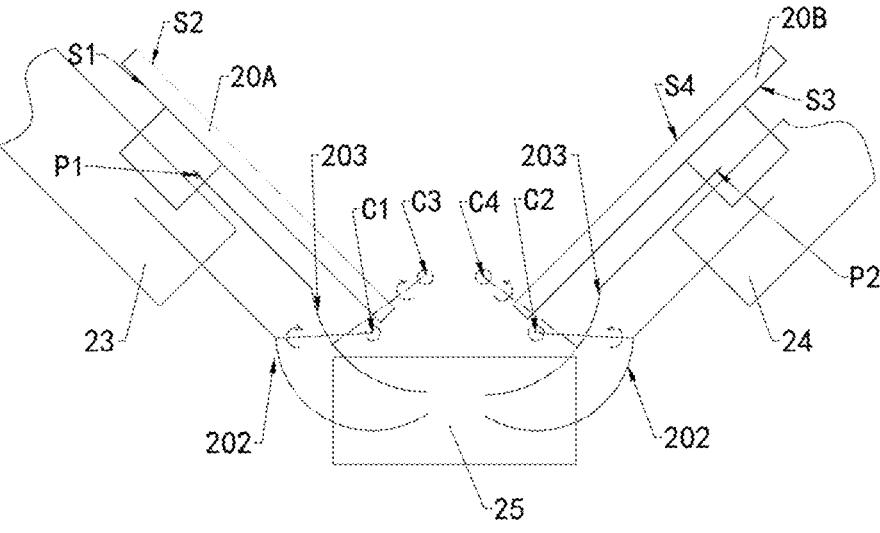
FIG. 6 is a diagram of a foldable apparatus in an intermediate state according to an implementation of this application.
Figure 7:
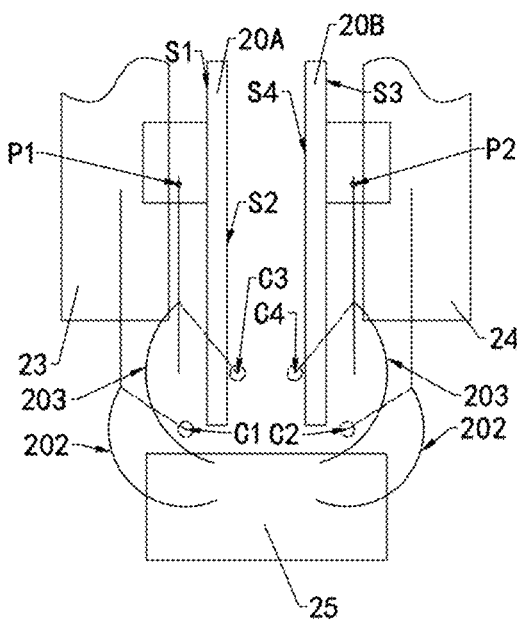
FIG. 7 is a diagram of a foldable apparatus in a folded state according to an implementation of this application.

FIG. 5, FIG. 6, and FIG. 7 schematically show an unfolded state, an intermediate state, and a folded state of the foldable apparatus 20, and schematically show positions and action processes of the first rotating assembly 202 and the second rotating assembly 203 in each state.

Refer to FIG. 5, FIG. 6, and FIG. 7. When the foldable apparatus 20 is in the unfolded state, the first mounting plate 23 is rotatably connected to the hinge 25 through the first rotating assembly 202, and a first axis C1 is formed; and the second mounting plate 24 is rotatably connected to the hinge 25 through the first rotating assembly 202, and a second axis C2 is formed. In a process of opening and closing (namely, a process of unfolding or folding) the first mounting plate 23 and the second mounting plate 24 relative to each other, the first mounting plate 23 rotates relative to the hinge 25 by using the first axis C1 as a center, and the second mounting plate 24 rotates relative to the hinge 25 by using the second axis C2 as a center. The first shielding plate 20A is rotatably connected to the hinge 25 through the second rotating assembly 203, and a third axis C3 is formed. The second shielding plate 20B is rotatably connected to the hinge 25 through the second rotating assembly 203, and a fourth axis C4 is formed. The first axis C1 and the third axis C3 are non-collinear, and the second axis C2 and the fourth axis C4 are non-collinear. An extension direction of the first axis C1, an extension direction of the second axis C2, an extension direction of the third axis C3, and an extension direction of the fourth axis C4 are all a length direction Y of the electronic device, and an extension direction of the hinge 25 is also the length direction Y of the electronic device. The first axis C1, the second axis C2, the third axis C3, and the fourth axis C4 in FIG. 5, FIG. 6, and FIG. 7 are represented by center positions of dashed-line circles.

The first shielding plate 20A includes a first inner surface S1 and a first outer surface S2, and the second shielding plate 20B includes a second inner surface S3 and a second outer surface S4. The first inner surface S1 is a surface that is of the first shielding plate 20A and that faces the hinge 25 and the first mounting plate 23 in the unfolded state, and the first outer surface S2 is a surface that is of the first shielding plate 20A and that faces away from the first mounting plate 23 and the hinge 25 in the unfolded state, that is, the first outer surface S2 is an appearance surface of the first shielding plate 20A. Similarly, the second inner surface S3 is a surface that is of the second shielding plate 20B and that faces the hinge 25 and the second mounting plate 24 in the unfolded state, and the second outer surface S4 is a surface that is of the second shielding plate 20B and that faces away from the second mounting plate 24 and the hinge 25 in the unfolded state, that is, the second outer surface S4 is an appearance surface of the second shielding plate 20B.

In the unfolded state shown in FIG. 5, in the width direction X, the first axis C1 and the second axis C2 are arranged opposite to each other at an interval, and the third axis C3 and the fourth axis C4 are arranged opposite to each other at an interval. In the unfolded state, the first shielding plate 20A and the second shielding plate 20B are interconnected to form an integrated plate-shaped structure, and are configured to jointly shield the hinge 25. The first axis C1 is located on a side of an inner surface of the first shielding plate 20A (that is, on the first inner surface S1, or between the first inner surface S1 and the hinge 25, or on the hinge 25), and the second axis C2 is located on a side of an inner surface of the second shielding plate 20B (that is, on the second inner surface S3, or between the second inner surface S3 and the hinge 25, or on the hinge 25). The third axis C3 is located on the first outer surface S2 or on a side that is of the first outer surface S2 and that is away from the first inner surface S1, and the fourth axis C4 is located on the second outer surface S4 or on a side that is of the second outer surface S4 and that is away from the second inner surface S3.

Refer to FIG. 6. In the intermediate state, an included angle is formed between the first mounting plate 23 and the second mounting plate 24, and an included angle is formed between the first shielding plate 20A and the second shielding plate 20B. The first axis C1 is located on a side that is of the first inner surface S1 and that is away from the first outer surface S2, the third axis C3 is located on a side that is of the first outer surface S2 and that is away from the first inner surface S1, the second axis C2 is located on a side that is of the second inner surface S3 and that is away from the second outer surface S4, and the fourth axis C4 is located on a side that is of the second outer surface S4 and that is away from the second inner surface S3.

Refer to FIG. 7. In the folded state, the first shielding plate 20A and the second shielding plate 20B are disposed opposite to each other in a stacked manner. In addition, the first shielding plate 20A and the second shielding plate 20B are located between the first mounting plate 23 and the second mounting plate 24. The first axis C1 is located on a side that is of the first inner surface S1 and that is away from the first outer surface S2, the third axis C3 is located on a side that is of the first outer surface S2 and that is away from the first inner surface S1, the second axis C2 is located on a side that is of the second inner surface S3 and that is away from the second outer surface S4, and the fourth axis C4 is located on a side that is of the second outer surface S4 and that is away from the second inner surface S3.

Specifically, positions of the first axis C1 and the second axis C2 may determine motion tracks of the first mounting plate 23 and the second mounting plate 24 in an unfolding process and a folding process. In the thickness direction Z of the electronic device 100, if the first axis C1 and the second axis C2 are limited to inner sides (that is, inner surfaces of the two shielding plates, or between an inner surface of each of the two shielding plates and the hinge, or on the hinge) of the first shielding plate 20A and the second shielding plate 20B, the first rotating assembly 202 can have a small size. If the first axis C1 and the second axis C2 are limited to outer sides (that is, outer surfaces of the two shielding plates or in space on sides that are of the outer surfaces of the two shielding plates and that are away from the inner surfaces) of the first shielding plate 20A and the second shielding plate 20B, the first rotating assembly 202 has a large size in the width direction X, and occupies large space in the electronic device. Therefore, in this embodiment of this application, the first axis C1 and the third axis C3 are non-collinear, and the second axis C2 and the fourth axis C4 are non-collinear, so that the second rotating assembly 203 and the first rotating assembly 202 can be limited within an ideal range in the width direction X, and a design of miniaturization of the electronic device is implemented.

Because the first axis C1 and the second axis C2 are on the inner sides of the first shielding plate 20A and the second shielding plate 20B, if the first axis C1 and the third axis C3 are collinear, the second axis C2 and the fourth axis C4 are collinear, and in the thickness direction Z, there is no sufficient avoidance space between the first shielding plate 20A, the second shielding plate 20B, and the hinge 25, the first shielding plate 20A and the second shielding plate 20B interfere with the hinge 25 in an unfolding process or a folding process. In this application, each of the third axis C3 and the fourth axis C4 is disposed on a side of the outer surface of each of the first shielding plate 20A and the second shielding plate 20B, so that a small size in the thickness direction Z can be met. In addition, the first shielding plate 20A and the second shielding plate 20B do not interfere with the hinge 25.

Therefore, in this embodiment of this application, positions of the first axis C1, the second axis C2, the third axis C3, and the fourth axis C4 are set, so that the first shielding plate 20A and the second shielding plate 20B of the foldable apparatus can be smoothly opened and closed. In addition, a small size in the width direction X and thinning in the thickness direction Z can be implemented.

When the first axis C1 and the third axis C3 are non-collinear, to prevent both the first shielding plate 20A and the first mounting plate 23 from rotating smoothly in a folding process or an unfolding process, a structure P1 having a degree of freedom needs to be disposed at a joint between the first shielding plate 20A and the second rotating assembly 203, so that the first shielding plate 20A can be pushed to slide relative to the first mounting plate 23 in a process in which the second rotating assembly 203 rotates relative to the hinge 25. In this way, relative positions between the first shielding plate 20A and the first mounting plate 23 are adjusted. Similarly, when the second axis C2 and the fourth axis C4 are non-collinear, to prevent both the second shielding plate 20B and the second mounting plate 24 from rotating smoothly in a folding process or an unfolding process, a structure P2 having a degree of freedom needs to be disposed at a joint between the second shielding plate 20B and the second rotating assembly 203, so that the second shielding plate 20B can be pushed to slide relative to the second mounting plate 24 in a process in which the second rotating assembly 203 rotates relative to the hinge 25. In this way, relative positions between the second shielding plate 20B and the second mounting plate 24 are adjusted.

That the structure P1 having a degree of freedom is disposed at the joint between the second rotating assembly 203 and the first shielding plate 20A may be understood as the following: The second rotating assembly 203 and the first shielding plate 20A are movably connected (for example, may be rotatably connected or slidably connected), and the second rotating assembly 203 and the first shielding plate 20A may rotate or move relative to each other. The structure P1 having a degree of freedom is configured to overcome an interference problem that is generated in the folding process or the unfolding process because the first axis C1 and the third axis C3 are non-collinear. Specifically, the first shielding plate 20A is slidably connected to the first mounting plate 23, and the second shielding plate 20B is slidably connected to the second mounting plate 24.

In a process of switching between the unfolded state and the folded state, a position of the hinge 25 is fixed. The positions of the first axis C1, the second axis C2, the third axis C3, and the fourth axis C4 remain unchanged relative to the position of the hinge 25. A state shown in FIG. 6 is compared with the unfolded state shown in FIG. 5. The first mounting plate 23 rotates clockwise by using the first axis C1 as a center, the second mounting plate 24 rotates counterclockwise by using the second axis C2 as a center, the first shielding plate 20A rotates clockwise by using the third axis C3 as a center, and the second shielding plate 20B rotates counterclockwise by using the fourth axis C4 as a center. The first mounting plate 23 and the first shielding plate 20A rotate at a same angle, and the first shielding plate 20A slides relative to the first mounting plate 23 in the width direction X.

Because the first axis C1 and the third axis C3 are non-collinear, in a folding process, the second rotating assembly 203 exerts pushing force on the first shielding plate 20A to accelerate a sliding speed of the first shielding plate 20A relative to the first mounting plate 23, so that the first shielding plate 20A quickly moves to a folded state, and folding efficiency can be improved.

Figure 8:
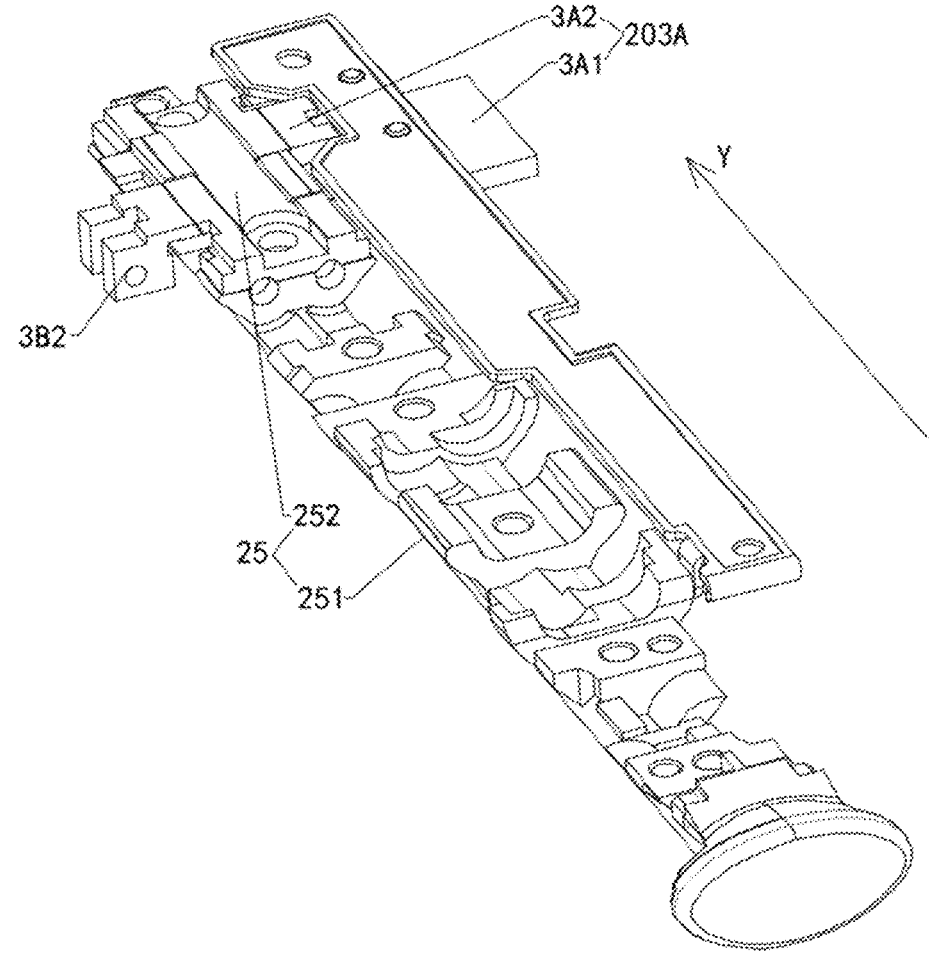
FIG. 8 is an assembly diagram of a second rotating assembly of a foldable apparatus according to an implementation of this application.
Figure 9:
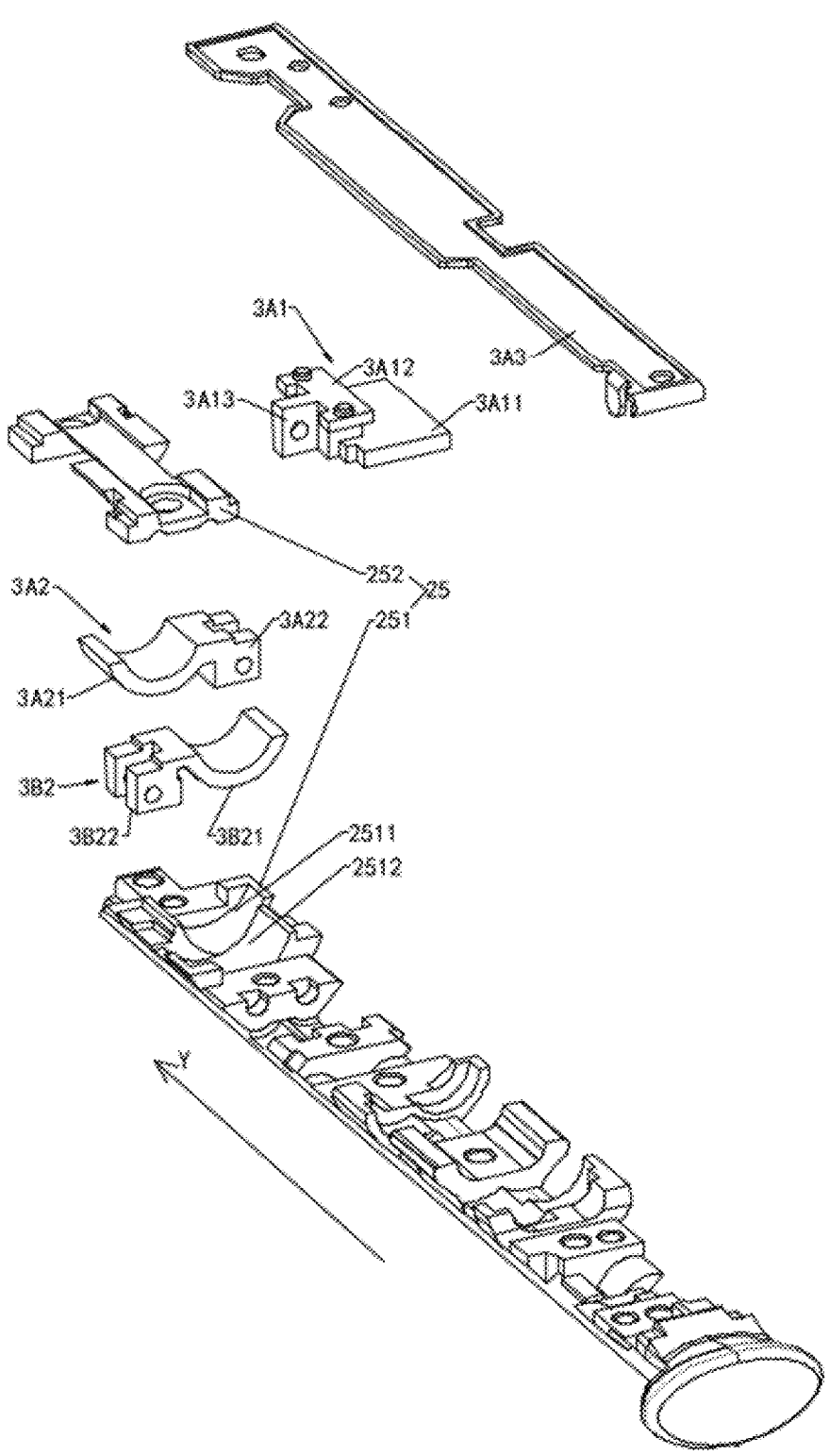
FIG. 9 is a three-dimensional exploded diagram of the second rotating assembly shown in FIG. 8.
Figure 10:
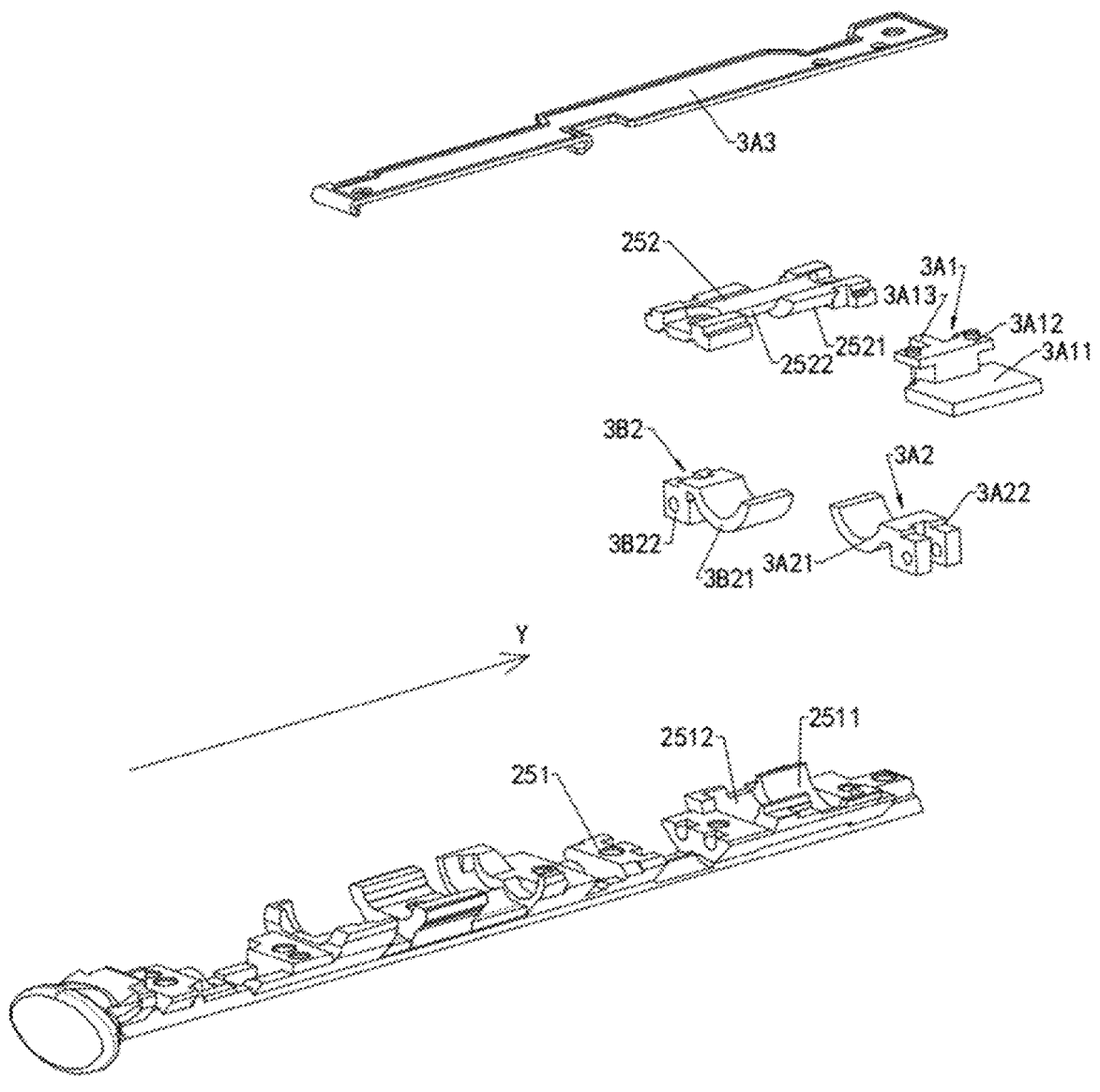
FIG. 10 is a three-dimensional exploded diagram of the second rotating assembly shown in FIG. 8 in another direction.

For a specific structure of the second rotating assembly 203, refer to FIG. 3B, FIG. 4B, FIG. 8, FIG. 9, and FIG. 10. Positions of cross sections shown in FIG. 3B and FIG. 4B are cross-sectional structures of the second rotating assembly 203. FIG. 8 is an assembly diagram of structures of parts of the second rotating assembly 203. FIG. 9 is a three-dimensional exploded diagram of the second rotating assembly 203 shown in FIG. 8. FIG. 10 is a three-dimensional exploded diagram of the second rotating assembly 203 shown in FIG. 8 in another direction.

Refer to FIG. 3B and FIG. 4B. The second rotating assembly 203 includes an assembly 1 marked as 203A and an assembly 2 marked as 203B. The assembly 1 marked as 203A is connected to the first shielding plate 20A, and the assembly 2 marked as 203B is connected to the second shielding plate 20B. In an implementation, a specific structure of the assembly 1 marked as 203A and a specific structure of the assembly 2 marked as 203B may be the same. The following describes a detailed structure of the assembly 1 marked as 203A in detail.

The assembly 1 marked as 203A includes a first sliding block 3A1 and a first rotating arm 3A2. The first rotating arm 3A2 is rotatably connected to the hinge 25, and a rotation center of a structure in which the first rotating arm 3A2 and the hinge 25 are rotatably connected is the third axis C3. The first sliding block 3A1 is fastened to the first shielding plate 20A, and the first sliding block 3A1 is slidably connected to the first mounting plate 23. A joint between the first sliding block 3A1 and the first rotating arm 3A2 has a degree of freedom, so that the first sliding block 3A1 and the first shielding plate 20A can be pushed to slide relative to the first mounting plate 23 in a process in which the first rotating arm 3A2 rotates relative to the hinge 25. In the implementations shown in FIG. 3B and FIG. 4B, the first sliding block 3A1 is rotatably connected to the first rotating arm 3A2 through a rotating axis D1. In this way, in a process in which the first rotating arm 3A2 rotates relative to the hinge 25, an interference problem generated because the first axis C1 and the third axis C3 are non-collinear is relieved between the first sliding block 3A1 and the first rotating arm 3A2 in a relative rotation manner. In another implementation, the first sliding block 3A1 may alternatively be movably connected to the first rotating arm 3A2, for example, may be slidably connected to the first rotating arm 3A2 through fitting between a sliding groove and a sliding block. Provided that a movement track of the sliding block in the sliding groove is limited, positions of the first sliding block 3A1 and the first rotating arm 3A2 can be adjusted. In addition, in a position adjustment process, the first rotating arm 3A2 may generate pushing force on the first sliding block 3A1, so that sliding speeds of the first shielding plate 20A and the first sliding block 3A1 relative to the first mounting plate 23 increase.

The assembly 2 marked as 203B includes a second sliding block 3B1 and a second rotating arm 3B2. The second rotating arm 3B2 is rotatably connected to the hinge 25, and a rotation center of a structure in which the second rotating arm 3B2 and the hinge 25 are rotatably connected is the fourth axis C4. The second sliding block 3B1 is fastened to the second shielding plate 20B, and the second sliding block 3B1 is slidably connected to the second mounting plate 24. A joint between the second sliding block 3B1 and the second rotating arm 3B2 has a degree of freedom, so that the second sliding block 3B1 and the second shielding plate 20B can be pushed to slide relative to the second mounting plate 24 in a process in which the second rotating arm 3B2 rotates relative to the hinge 25. In the implementations shown in FIG. 3B and FIG. 4B, the second sliding block 3B1 is rotatably connected to the second rotating arm 3B2 through a rotating axis D2. In this way, in a process in which the second rotating arm 3B2 rotates relative to the hinge 25, an interference problem generated because the second axis C2 and the fourth axis C4 are non-collinear is relieved between the second sliding block 3B1 and the second rotating arm 3B2 in a relative rotation manner. In another implementation, the second sliding block 3B1 may alternatively be movably connected to the second rotating arm 3B2, for example, may be slidably connected to the second rotating arm 3B2 through fitting between a sliding groove and a sliding block. Provided that a movement track of the sliding block in the sliding groove is limited, positions of the second sliding block 3B1 and the second rotating arm 3B2 can be adjusted. In addition, in a position adjustment process, the second rotating arm 3B2 may generate pushing force on the second sliding block 3B1, so that sliding speeds of the second shielding plate 20B and the second sliding block 3B1 relative to the second mounting plate 24 increase.

Figure 4C:
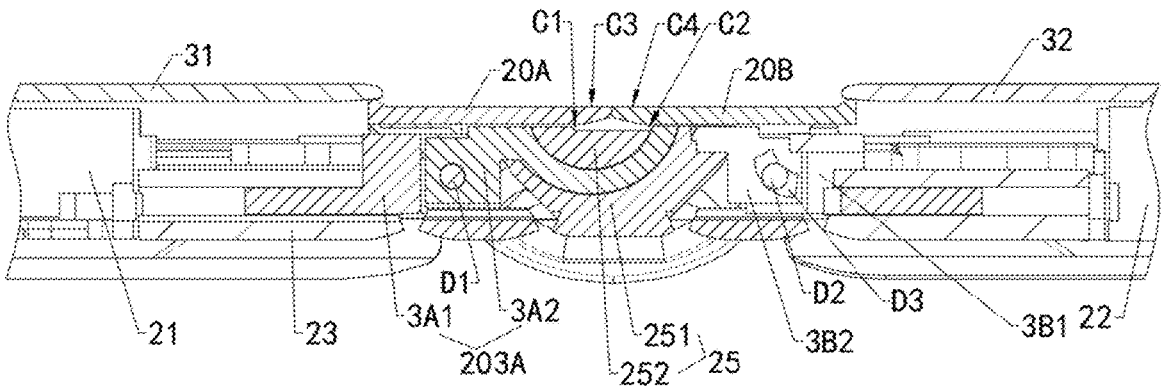
FIG. 4C is a partially enlarged planar cross-sectional view in which a foldable apparatus and a rear housing of an electronic device are assembled together according to another implementation of this application.

Refer to FIG. 4C. In an implementation shown in FIG. 4C, the second sliding block 3B1 and the second rotating arm 3B2 are slidably connected, a sliding groove D3 is disposed on the second rotating arm 3B2, the second sliding block 3B1 has a rotating axis D2, and the rotating axis D2 fits the sliding groove D3. A movement track of the rotating axis D2 is limited by limiting a form of the sliding groove D3, so that the positions of the second sliding block 3B1 and the second rotating arm 3B2 can be adjusted.

Refer to FIG. 8, FIG. 9, and FIG. 10. The three figures describe structures of the assembly 1 marked as 203A, the hinge 25, and the second rotating arm 3B2 in the assembly 2 marked as 203B. The hinge 25 includes a fastening base 251 and a fastening cover 252. The fastening cover 252 is fastened to a top of the fastening base 251 in a thickness direction. A first arc-shaped groove 2511 and a second arc-shaped groove 2512 are disposed on a surface that is of the fastening base 251 and that faces the fastening cover 252. The first arc-shaped groove 2511 and the second arc-shaped groove 2512 are arranged in a length direction Y, and can be disposed adjacently. A first arc surface 2521 and a second arc surface 2522 are disposed on a surface that is of the fastening cover 252 and that faces the fastening base 251. The fastening cover 252 is fastened to the fastening base 251. Specifically, the fastening cover 252 may be fastened to the fastening base 251 by using a screw or glue. It may be understood that: the first arc surface 2521 and the first arc-shaped groove 2511 are disposed opposite to each other, and a first rotating sliding groove configured to accommodate the first rotating arm 3A2 is formed between the first arc surface 2521 and the first arc-shaped groove 2511; and the second arc surface 2522 and the second arc-shaped groove 2512 are disposed opposite to each other, and a second rotating sliding groove configured to accommodate the second rotating arm 3B2 is formed between the second arc surface 2522 and the second arc-shaped groove 2512. The first rotating sliding groove fits the first rotating arm 3A2 to form a rotating connection between the assembly 1 marked as 203A and the hinge 25, and the second rotating sliding groove fits the second rotating arm 3B2 to form a rotating connection between the assembly 2 marked as 203B and the hinge 25.

The first rotating arm 3A2 includes a first arc-shaped arm 3A21 and a first hinged portion 3A22. The first rotating arm 3A2 is of an integrated structure, the first hinged portion 3A22 is located at an end of the first arc-shaped arm 3A21, and the first arc-shaped arm 3A21 is configured to fit the first rotating sliding groove. The third axis is an arc center of the first arc-shaped arm, and a rotating connection between the first rotating arm and the hinge is implemented through fitting between the first arc-shaped arm and the first rotating sliding groove. This has an advantage that a movement track is simple and reliable. The first hinged portion 3A22 is rotatably connected to the first sliding block 3A1. The second rotating arm 3B2 and the first rotating arm 3A2 have a same structure. The second rotating arm 3B2 includes a second arc-shaped arm 3B21 and a second hinged portion 3B22. The second rotating arm 3B2 is of an integrated structure, the second hinged portion 3B22 is located at an end of the second arc-shaped arm 3B21, and the second arc-shaped arm 3B21 is configured to fit the second rotating sliding groove. The second hinged portion 3B22 is rotatably connected to the second sliding block 3B1.

The first sliding block 3A1 includes a sliding fitting portion 3A11, a shielding plate fastening portion 3A12, and a rotating connection portion 3A13. The sliding fitting portion 3A11 is configured to slidably fit the first mounting plate 23. The sliding fitting portion 3A11 is in a flat plate shape, and may be parallel to the first shielding plate 20A. The sliding fitting portion 3A11 is designed to be in the flat plate shape, so that sliding fitting between the first sliding block 3A1 and the first mounting plate 23 is simple. This facilitates processing and assembly, and can also ensure that the first mounting plate 23 and the first shielding plate 20A have stable and reliable motion tracks. The rotating connection portion 3A13 is rotatably connected to the first hinged portion 3A22 of the first rotating arm 3A2. The shielding plate fastening portion 3A12 is fastened to the first shielding plate 20A.

In a specific implementation, a first fastening plate 3A3 is fastened to the shielding plate fastening portion 3A12, and the first fastening plate 3A3 is a middleware through which the first sliding block 3A1 is fastened to the first shielding plate 20A. An area of a surface that is of the first fastening plate 3A3 and that is connected to the first shielding plate 20A is greater than an area of the shielding plate fastening portion 3A12. The first fastening plate 3A3 is fastened to the first shielding plate 20A, so that it can be ensured that the first shielding plate 20A is stably and reliably connected.

In a specific implementation, the first shielding plate 20A and the first fastening plate 3A3 are in a detachable connection relationship. A detachable connection design enables the first shielding plate 20A to be easily replaced.

A specific structure of the assembly 2 marked as 203B may be the same as that of the assembly 1 marked as 203A. Details are not described again.

Figures 11, 12:
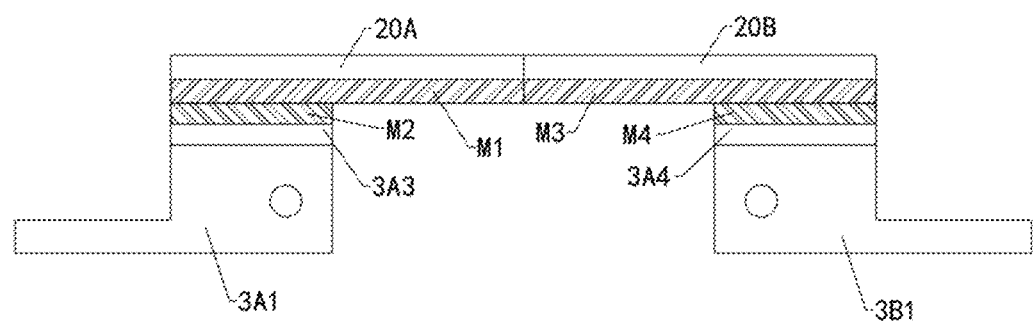
FIG. 11 is a diagram of a structure related to a first shielding plate and a second shielding plate of a foldable apparatus in an unfolded state according to an implementation of this application.
FIG. 12 is an assembly diagram of a structure related to a first rotating assembly of a foldable apparatus according to an implementation of this application.

Refer to FIG. 11. In a specific implementation, the first fastening plate 3A3 is connected between the first sliding block 3A1 and the first shielding plate 20A. The first fastening plate 3A3 is connected to the first shielding plate 20A through magnetic attraction force, and when the foldable apparatus is in the unfolded state, the first shielding plate 20A and the second shielding plate 20B are interconnected through magnetic attraction force. Specifically, a first magnetic piece M1 is disposed inside the first shielding plate 20A, a second magnetic piece M2 is disposed inside the first fastening plate 3A3 (or the first fastening plate 3A3 is of a magnetic structure), and a third magnetic piece M3 is disposed inside the second shielding plate 20B. The second fastening plate 3A4 is connected between the second sliding block 3B1 and the second shielding plate 20B, and a fourth magnetic piece M4 is disposed inside the second fastening plate 3A4 (or the second fastening plate 3A4 is of a magnetic structure). The first shielding plate 20A is fastened to the first fastening plate 3A3 through magnetic attraction force between the first magnetic piece M1 and the second magnetic piece M2. The second shielding plate 20B is fastened to the second fastening plate 3A4 through magnetic attraction force between the third magnetic piece M3 and the fourth magnetic piece M4. When the foldable apparatus is in the unfolded state, the first shielding plate 20A and the second shielding plate 20B are seamlessly spliced through magnetic attraction force between the first magnetic piece M1 and the third magnetic piece M3. In this way, it can be ensured that there is no seam at a joint between the first shielding plate 20A and the second shielding plate 20B in the unfolded state, and appearance integrity of the electronic device and user experience are improved.

Figure 13:
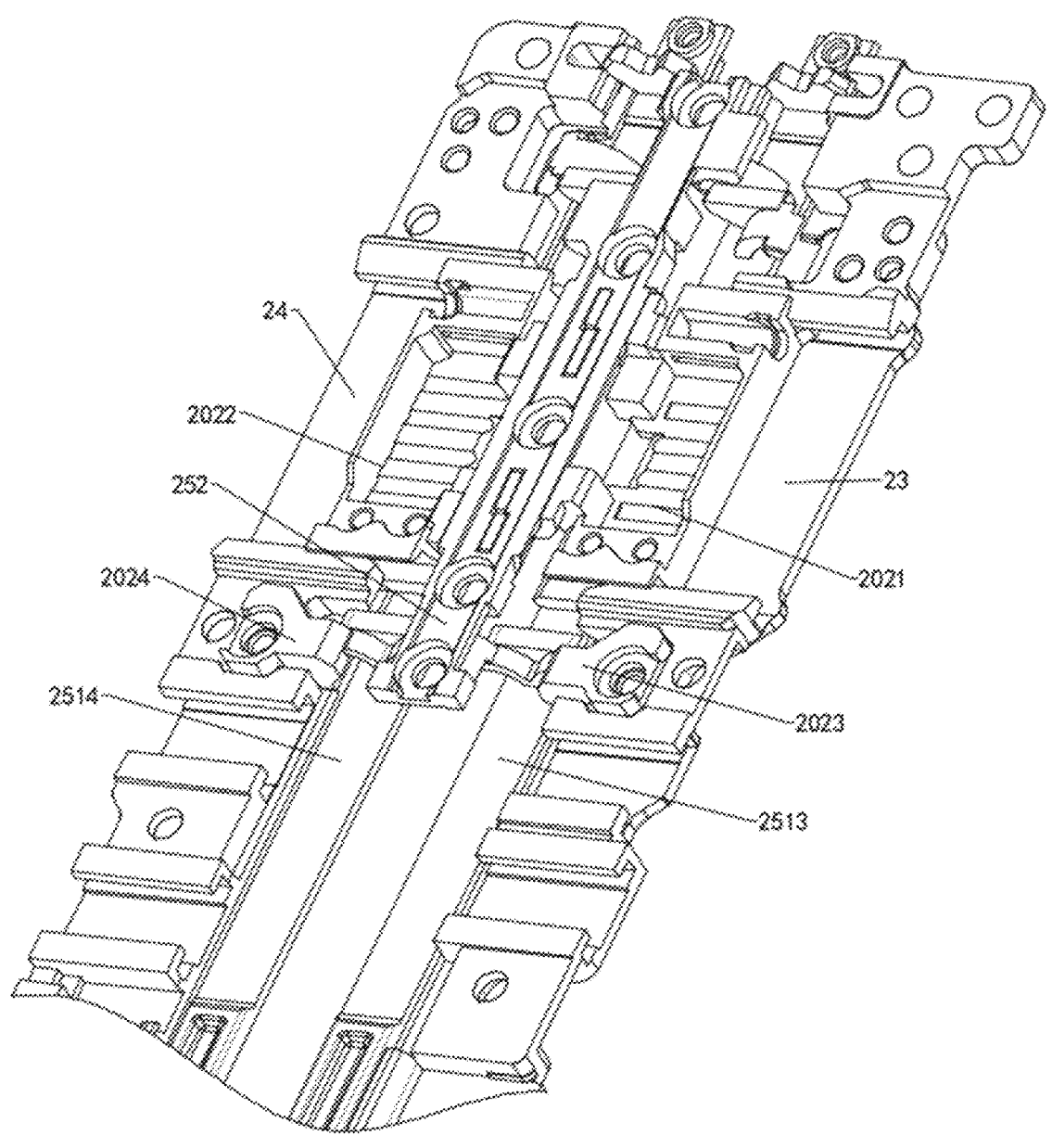
FIG. 13 is an assembly diagram of a structure related to a first rotating assembly of a foldable apparatus according to an implementation of this application.
Figure 14:
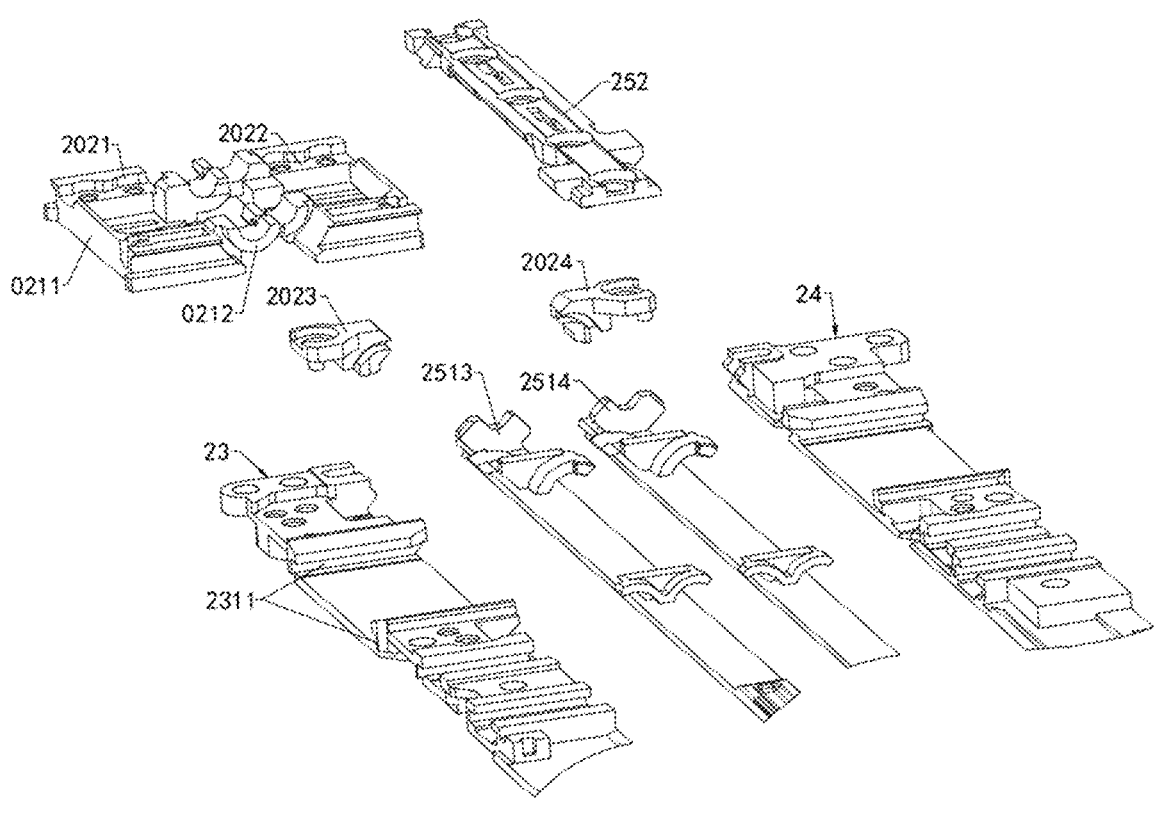
FIG. 14 is an exploded diagram of a structure related to a first rotating assembly of a foldable apparatus according to an implementation of this application.
Figure 15:
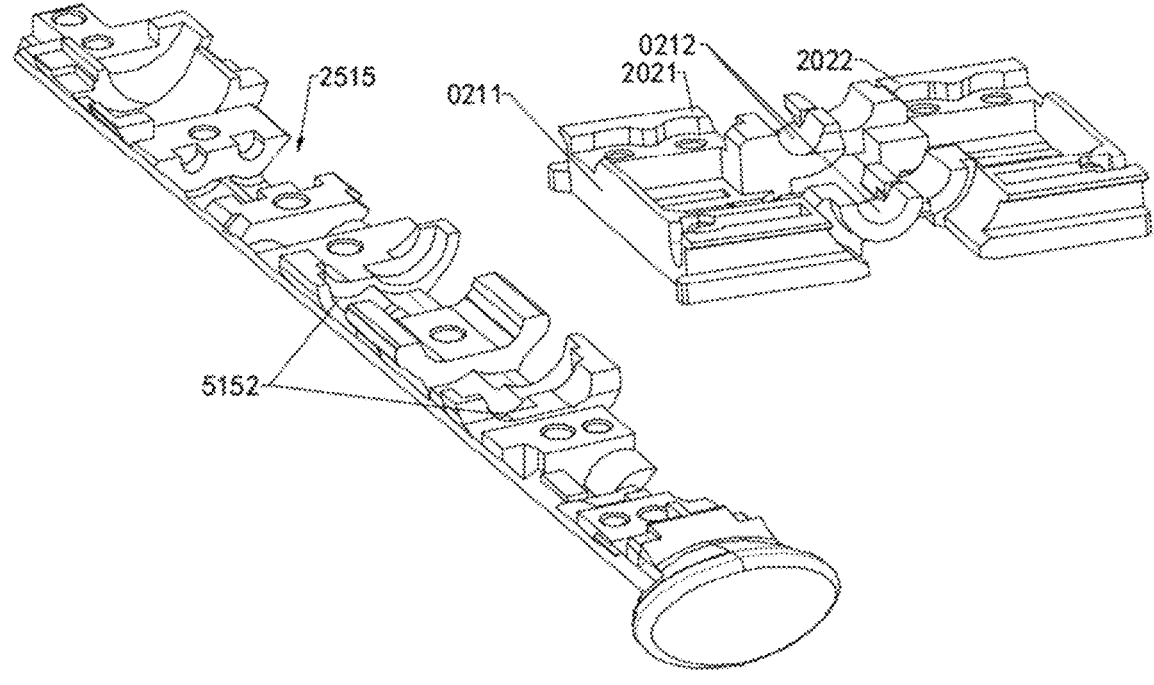
FIG. 15 is an exploded diagram of a partial structure of a first rotating assembly and a hinge of a foldable apparatus according to an implementation of this application.

A specific structure of a first rotating assembly is described in detail based on FIG. 12, FIG. 13, FIG. 14, and FIG. 15. FIG. 12 and FIG. 13 are diagrams of a first rotating assembly 202, a first mounting plate 23, a second mounting plate 24, and a part of a hinge 25. FIG. 14 is a three-dimensional exploded diagram of a structure shown in FIG. 12. FIG. 15 is a diagram of two sliding portions in the first rotating assembly 202 and a part of the hinge 25.

Refer to FIG. 12, FIG. 13, FIG. 14, and FIG. 15. The first rotating assembly 202 includes a first sliding portion 2021, a second sliding portion 2022, a first rotating portion 2023, and a second rotating portion 2024. The hinge 25 includes a fastening base 251 and a fastening cover 252. The fastening base 251 includes a first turnover bar 2513, a second turnover bar 2514, and a main base body 2515 that all extend in a length direction. The fastening cover 252 is fastened to a top of the main base body 2515. A part of the first sliding portion 2021 and a part of the second sliding portion 2022 are accommodated between the fastening cover 252 and the main base body 2515. Refer to FIG. 12 and FIG. 15. A main base body is omitted in FIG. 12, and the main base body 2515 in FIG. 15 may be understood as a main base body between the first turnover bar 2513 and the second turnover bar 2514 in FIG. 12. In an unfolded state, in a width direction X, the first turnover bar 2513 and the second turnover bar 2514 are respectively disposed on two sides of the main base body 2515, and both the first turnover bar 2513 and the second turnover bar 2514 are rotatably connected to the main base body 2515. In a process in which a foldable apparatus switches from the unfolded state to a folded state, both the first turnover bar 2513 and the second turnover bar 2514 flip relative to the main base body 2515, to adjust a posture of the hinge 25. A surface that is of the hinge 25 and that is used to support a flexible display is planar in the unfolded state, and is arc-shaped in the folded state.

The first sliding portion 2021 is slidably connected to the first mounting plate 23, and the first sliding portion 2021 is rotatably connected to the main base body 2515. Specifically, as shown in FIG. 14 and FIG. 15, the first sliding portion 2021 includes a sliding main body 0211 and a hinge rotating arm 0212. The hinge rotating arm 0212 is located at an end of the sliding main body 0211, and the sliding main body 0211 fits a sliding rail 2311 on the first mounting plate 23. The hinge rotating arm 0212 slidably fits the first fitting portion 5152 on the main base body 2515. Specifically, the hinge rotating arm 0212 is located between the main base body 2515 and the fastening cover 252, and forms a rotating connection structure. In a process of unfolding or folding the foldable apparatus, the sliding main body 0211 slides relative to the first mounting plate 23, and the hinge rotating arm 0212 and the first fitting portion 5152 slide relative to each other, so that the first sliding portion 2021 rotates relative to the hinge 25. A structure and a connection relationship of the second sliding portion 2022 are the same as those of the first sliding portion 2021. The second sliding portion 2022 is slidably connected to the second mounting plate 24, and the second sliding portion 2022 is rotatably connected to the main base body 2515 of the hinge 25.

The first rotating portion 2023 is fastened to the first mounting plate 23, and the first rotating portion 2023 is rotatably connected to the first turnover bar 2513. The first rotating portion 2023 is rotatably connected to the first turnover bar 2513 in an arc-shaped arm contact manner. A structure and a connection relationship of the second rotating portion 2024 are the same as those of the first rotating portion 2023. That is, the second rotating portion 2024 is fastened to the second mounting plate 24, and the second rotating portion 2024 is rotatably connected to the second turnover bar 2514.

Figure 16:
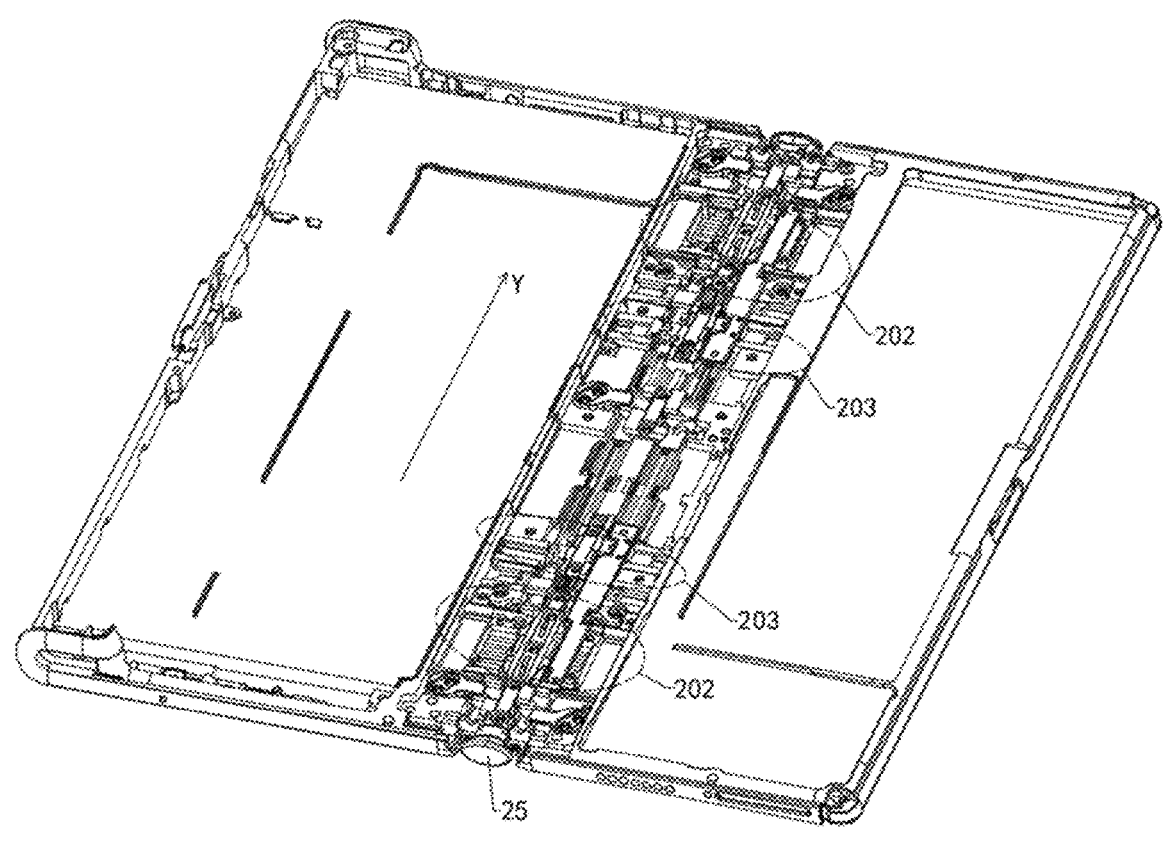
FIG. 16 is a diagram of an electronic device in an unfolded state according to an implementation of this application.

Refer to FIG. 16. Parts circled by dashed-line boxes in the figure represent the first rotating assembly 202 and the second rotating assembly 203. In an implementation, there are two first rotating assemblies 202 and two second rotating assemblies 203. In a length direction Y of the foldable apparatus, the two first rotating assemblies 202 are respectively close to two ends of the hinge 25. The two second rotating assemblies 203 are located between the two first rotating assemblies 202. One of the second rotating assemblies 203 is adjacent to one of the first rotating assemblies 202, and the other second rotating assembly 203 is adjacent to the other first rotating assembly 202.

Figure 17:
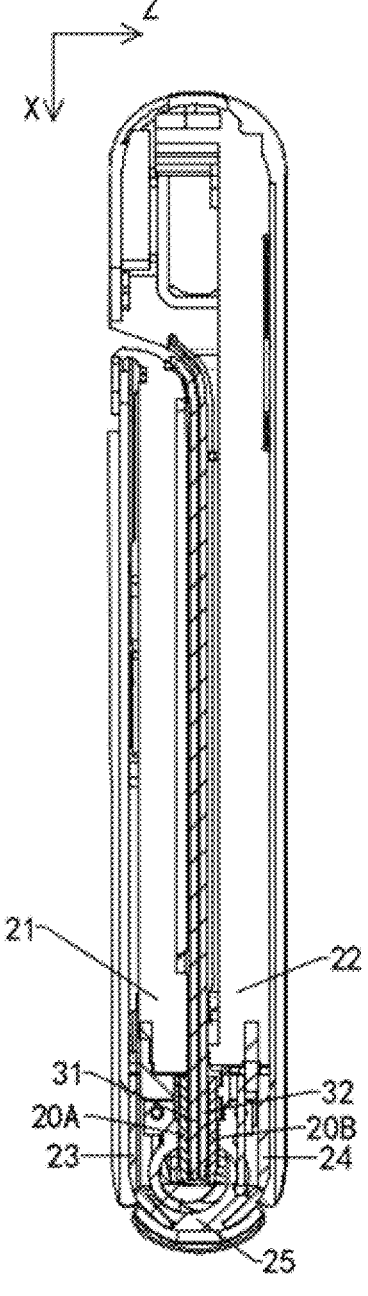
FIG. 17 is a diagram of an electronic device in a folded state according to an implementation of this application.
Figure 18:
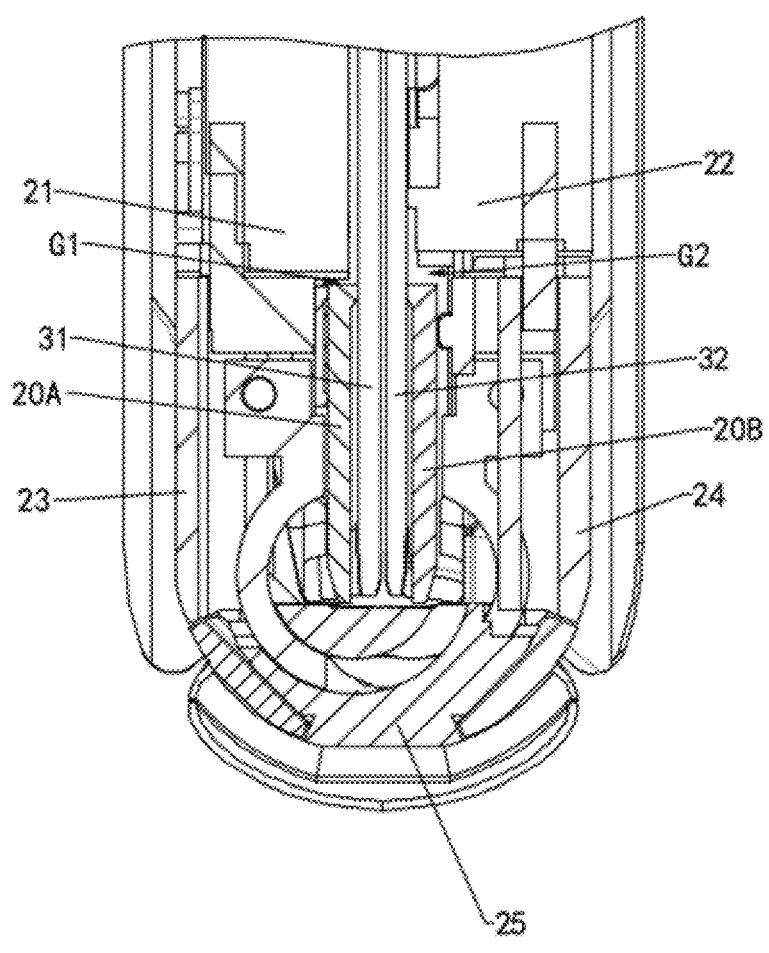
FIG. 18 is a partially enlarged view of FIG. 17.

Refer to FIG. 17 and FIG. 18. FIG. 18 is a partially enlarged view of FIG. 17. In an implementation, when the foldable apparatus is in the folded state, the first shielding plate 20A and the second shielding plate 20B are disposed in a stacked manner in a thickness direction Z, and space between the first shielding plate 20A and the second shielding plate 20B is used to accommodate rear housings (the first rear housing 31 and the second rear housing 32) of the electronic device. It may be understood as the following: In the folded state, the first shielding plate 20A moves to a side of an inner surface of the first rear housing 31, the second shielding plate 20B moves to a side of an inner surface of the second rear housing 32, an outer surface of the first rear housing 31 and an outer surface of the second rear housing 32 are disposed opposite to each other, and a gap may be disposed between the outer surface of the first rear housing 31 and the outer surface of the second rear housing 32, or the outer surface of the first rear housing 31 and the outer surface of the second rear housing 32 may be in contact with each other. The first shielding plate and the second shielding plate of the foldable apparatus provided in this solution occupy internal space of the first rear housing and the second rear housing. This helps implement a design of a small size of the foldable apparatus in the thickness direction. In a width direction X, a first gap G1 is disposed between the first shielding plate 20A and the first middle frame 21, and a second gap G2 is disposed between the second shielding plate 20B and the second middle frame 22. Disposal of the first gap G1 and the second gap G2 can ensure that in a process of unfolding and folding the electronic device, the first shielding plate 20A does not collide with the first middle frame 21, and the second shielding plate 20B does not collide with the second middle frame 22.

Figure 19:
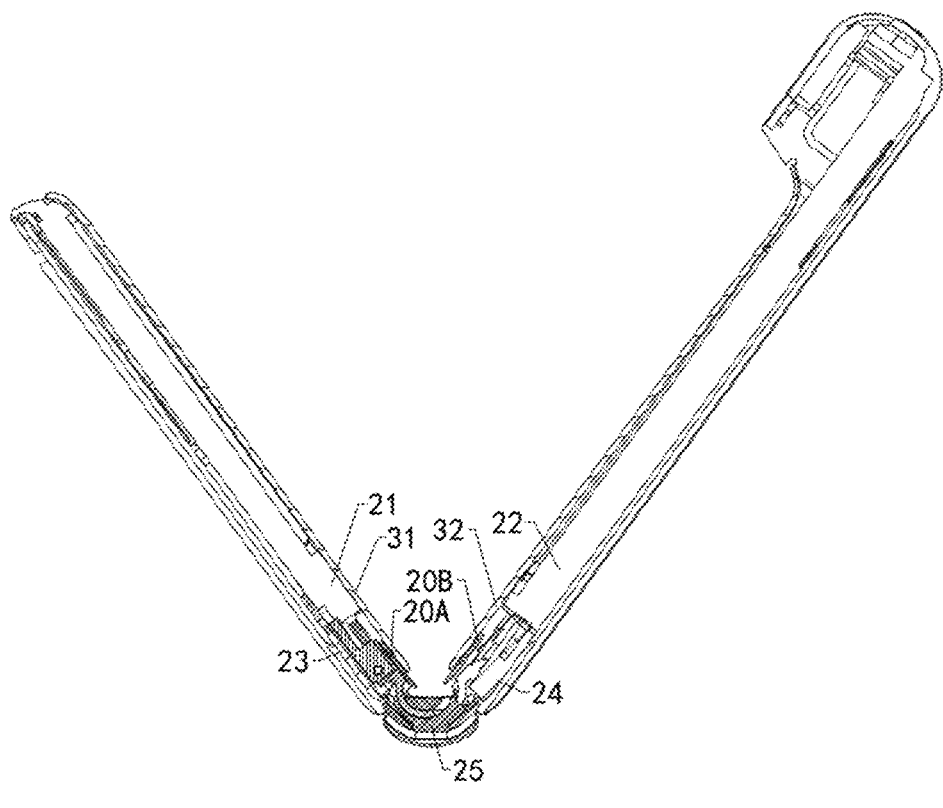
FIG. 19 is a diagram of an electronic device in an intermediate state according to an implementation of this application.
Figure 20:
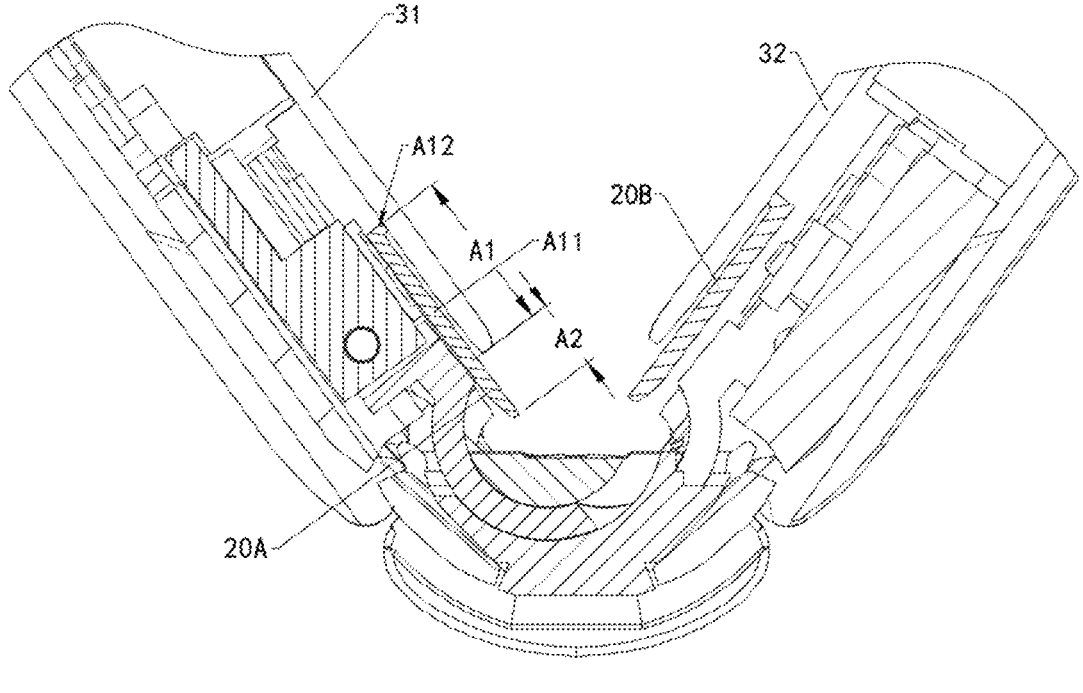
FIG. 20 is a partially enlarged view of FIG. 19.

Refer to FIG. 19 and FIG. 20. FIG. 20 is a partially enlarged view of FIG. 19. In an implementation, in the intermediate state between the folded state and the unfolded state, an included angle is formed between the first middle frame 21 and the second middle frame 22, a part of the first shielding plate 20A moves to a side of the inner surface of the first rear housing 31, and a part of the first shielding plate 20A is located outside the first rear housing 31 and is not shielded by the first rear housing 31. A part of the second shielding plate 20B moves to a side of the inner surface of the second rear housing 32, and a part of the second shielding plate 20B is located outside the second rear housing 32, and is not shielded by the second rear housing 32.

Refer to FIG. 20. The first shielding plate 20A includes a first part A1 and a second part A2 that are adjacent to each other. When the foldable apparatus is in the intermediate state, where the intermediate state is a state presented in a process of switching between the unfolded state and the folded state, the first part A1 is located on a side of the inner surface of the first rear housing 31, and is shielded by the first rear housing 31, and the second part A2 is correspondingly disposed on an outer side of a side edge of the first rear housing 31, that is, the second part A2 is not shielded by the first rear housing 31, and is in an exposed state. In this state, the second part A2 is used as an appearance part of the electronic device. The first part A1 includes a first main body A11 and a first protrusion A12. The first protrusion A12 protrudes from a surface of the first main body A11 and is in contact with the first rear housing 31, so that a gap is formed between the first main body A11 and the first rear housing 31. The second part A2 is connected to the first main body A11, and a surface that is of the second part A2 and that faces the first rear housing 31 and a surface that is of the first main body A11 and that faces the first rear housing 31 are coplanar. When the foldable apparatus is in the folded state, a gap is formed between the second part A2 and the first rear housing 31. In this solution, the first protrusion A12 is in contact with the first rear housing 31, and gaps are formed between the second part A2 of the first shielding plate 20A and the first rear housing 31 and between a part (the first main body A11), other than the first protrusion, of the first part A1 of the first shielding plate 20A and the first rear housing 31. This solution helps reduce an area of a friction interface between an outer surface of the first shielding plate 20A and the inner surface of the first rear housing 31. For the first shielding plate 20A, the outer surface of the first shielding plate 20A in the unfolded state may still maintain a gap with the first rear housing 31 in a folding process, and there is no friction between the outer surface of the first shielding plate 20A and the first rear housing 31, so that an appearance surface of the first shielding plate 20A can be prevented from being worn out.

Figure 21:
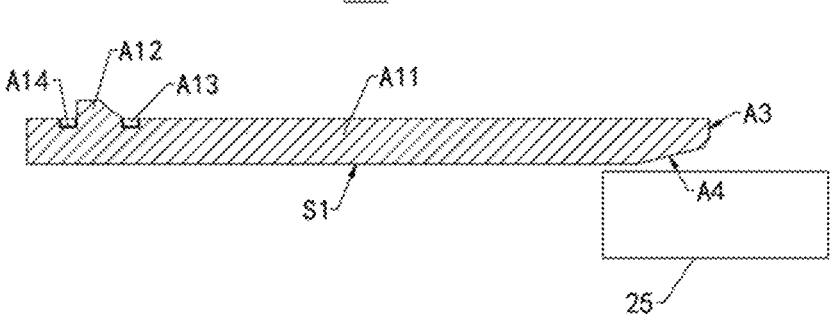
FIG. 21 is a diagram of a first shielding plate of a foldable apparatus according to an implementation of this application.

Refer to FIG. 21. In an implementation, a groove A13 is disposed at a joint between the first main body A11 and the first protrusion A12, and an adhesive material A14 is disposed on an inner wall of the groove A13. Friction between the first protrusion A12 and the first rear housing 31 easily leads to scraps. The groove A14 is used to accommodate the scraps, and the adhesive material is used to adsorb the scraps, to prevent a case in which user experience is affected because of the scraps scattering in another position of the electronic device.

Figure 22:
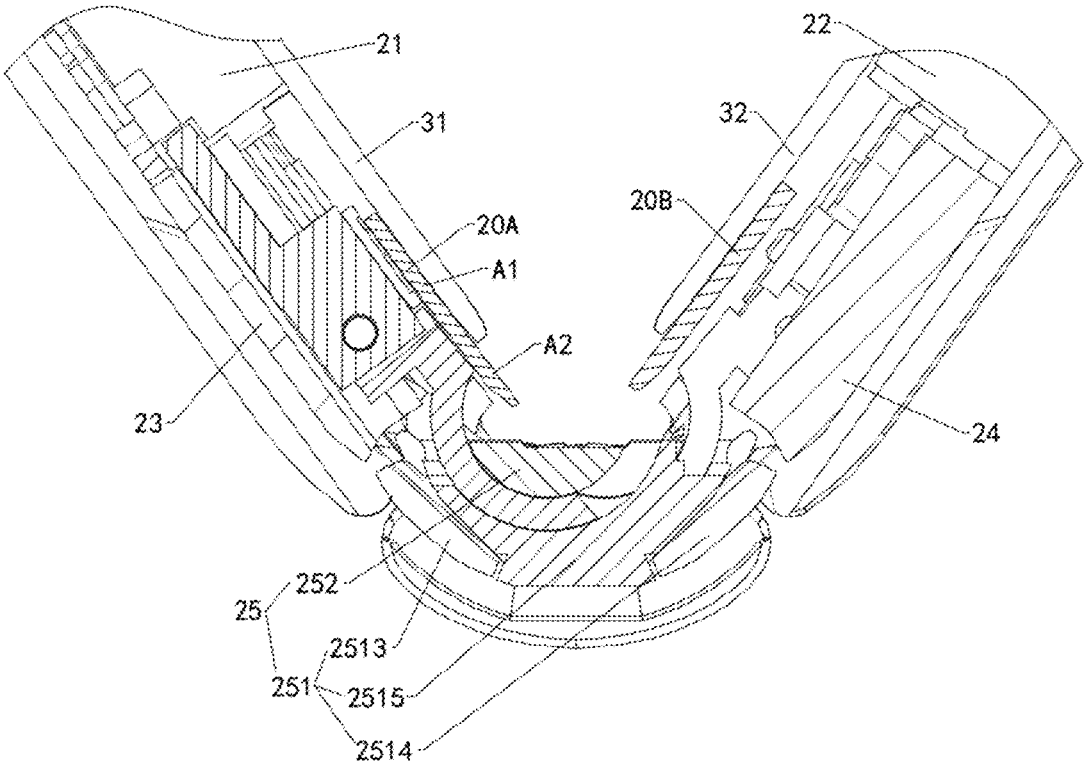
FIG. 22 is a partially enlarged diagram of an electronic device in an intermediate state according to an implementation of this application.

Refer to FIG. 22. The first shielding plate 20A includes a first part A1 and a second part A2 that are adjacent to each other. When the foldable apparatus is in the intermediate state, where the intermediate state is a state presented in a process of switching between the unfolded state and the folded state, the first part A1 is in contact with the inner surface of the first rear housing 31, and the second part A2 is located on an outer side of a side edge of the first rear housing 31, that is, the second part A2 is not shielded by the first rear housing 31, and is in an exposed state. In this state, the second part A2 is used as an appearance part of the electronic device. When the foldable apparatus is in the folded state, both the first part A1 and the second part A2 are in contact with the inner surface of the first rear housing 31. In this solution, both the first part A1 and the second part A2 are in contact with the inner surface of the first rear housing 31. This facilitates a design of thickness miniaturization of the foldable apparatus.

That a friction coefficient between the first shielding plate 20A and the first rear housing 31 is less than a preset value may be understood as the following: In this implementation, a low friction coefficient between the first shielding plate 20A and the first rear housing 31 is limited, so that friction between contact surfaces between the first shielding plate 20A and the first rear housing 31 leads to no obvious scratch in a process of opening and closing the foldable apparatus. In addition, the first shielding plate 20A moves more smoothly relative to the first rear housing 31. Specifically, a lubricating material layer may be disposed on a surface of the first shielding plate 20A. For example, the lubricating material layer is formed by spraying a polytetrafluoroethylene material, or the lubricating material layer may be disposed on the inner surface of the first rear housing 31, so that the friction coefficient between the first shielding plate 20A and the first rear housing 31 is less than the preset value. In this solution, a surface that is of the first part A1 of the first shielding plate 20A and that faces the first rear housing 31 and the surface that is of the second part A2 and that faces the first rear housing 31 are coplanar, that is, no protruding structure is disposed on a surface that is of the first shielding plate 20A and that faces the first rear housing 31, and the first shielding plate 20A is in direct surface contact with the first rear housing 31. In such a design, a smaller size of the foldable apparatus in a thickness direction can be implemented.

Refer to FIG. 21. In an implementation, the first shielding plate 20A includes a first side surface A3 and a first inclined surface A4. The first side surface A3 is interconnected to the second shielding plate 20B, the first inclined surface A4 is connected between the first side surface A3 and a first inner surface S1 of the first shielding plate 20A, and the first inclined surface A4 is configured to avoid the hinge 25. Specifically, in FIG. 21, a rectangular box is used to represent the hinge 25, and a distance between the first inner surface S1 and the hinge 25 is less than a distance between the first inclined surface A4 and the hinge 25. The distance between the first inclined surface A4 and the hinge 25 refers to an average value of distances between two ends (which are respectively an end connected to the first inner surface S1 and an end away from the first inner surface S1) of the first inclined surface A4 and the hinge 25. In this solution, a problem of interference between the first shielding plate 20A and the hinge 25 in a process of opening and closing the foldable apparatus is resolved by using the first inclined surface A4, so that a gap between the first shielding plate 20A and the hinge 25 can be smaller. This facilitates a thinning design of the electronic device.

First, second, third, fourth, and various numbers in this specification are merely used for differentiation for ease of description, and are not intended to limit the scope of this application.

It should be understood that sequence numbers of the foregoing processes do not mean execution sequences in various embodiments of this application. The execution sequences of the processes should be determined based on functions and internal logic of the processes, and should not constitute any limitation on the implementation processes of embodiments of this application.

The foregoing embodiments are merely intended for describing the technical solutions of this application, rather than limiting this application. Although this application is described in detail with reference to the foregoing embodiments, a person of ordinary skill in the art should understand that modifications may still be made to the technical solutions described in the foregoing embodiments, or equivalent replacements may still be made to some technical features thereof. These modifications or replacements do not make the essence of the corresponding technical solutions depart from the scope of the technical solutions of embodiments of this application.

What is claimed is:

1. A foldable apparatus, comprising:
a first mounting plate, a second mounting plate, and a hinge, wherein the hinge is rotatably connected to the first mounting plate, a rotation center at a rotation joint between the hinge and the first mounting plate is located at a first axis, the hinge is rotatably connected to the second mounting plate, and a rotation center at a rotation joint between the hinge and the second mounting plate is located at a second axis;
a first shielding plate and a first rotating arm, wherein the first shielding plate is slidably connected to the first mounting plate, the first rotating arm is rotatably connected to the hinge, a rotation center at a rotation joint between the first rotating arm and the hinge is located at a third axis, the third axis and the first axis are non-collinear, the first shielding plate is movably connected to the first rotating arm, and the first shielding plate is configured to slide relative to the first mounting plate when the first rotating arm rotates relative to the hinge; and
a second shielding plate and a second rotating arm, wherein the second shielding plate is slidably connected to the second mounting plate, the second rotating arm is rotatably connected to the hinge, a rotation center at a rotation joint between the second rotating arm and the hinge is located at a fourth axis, the fourth axis and the second axis are non-collinear, the second shielding plate is movably connected to the second rotating arm, and in a process in which the second rotating arm rotates relative to the hinge, the second shielding plate slides relative to the second mounting plate, wherein
when the foldable apparatus is in an unfolded state, the first shielding plate and the second shielding plate are configured to be interconnected; and
when the foldable apparatus is in a folded state, the first shielding plate and the second shielding plate are configured to be disposed between the first mounting plate and the second mounting plate in a stacked manner.

2. The foldable apparatus according to claim 1, wherein the first shielding plate comprises a first inner surface and a first outer surface that are disposed opposite to each other, the first inner surface faces the first rotating arm, and the third axis is located on the first outer surface or on a side of the first outer surface facing away from the first inner surface.

3. The foldable apparatus according to claim 1, wherein the first rotating arm is rotatably connected to the first shielding plate, or the first rotating arm is slidably connected to the first shielding plate.

4. The foldable apparatus according to claim 1, wherein the first rotating arm comprises a first arc-shaped arm, the first arc-shaped arm fits the hinge for a rotating connection between the first rotating arm and the hinge, and the third axis is an arc center of the first arc-shaped arm.

5. The foldable apparatus according to claim 1, further comprising a first sliding block, wherein the first shielding plate is slidably connected to the first mounting plate through the first sliding block, the first shielding plate is rotatably connected to the first rotating arm through the first sliding block, and the first shielding plate and the first sliding block have a detachable connection relationship.

6. The foldable apparatus according to claim 5, further comprising a first fastening plate fastened to the first sliding block, wherein the first shielding plate and the first fastening plate have a detachable connection relationship, and an area of a surface of the first fastening plate that is connected to the first shielding plate is greater than an area of a surface of the first sliding block that faces the first shielding plate.

7. The foldable apparatus according to claim 6, wherein the first fastening plate is connected to the first shielding plate by magnetic attraction, and the first shielding plate and the second shielding plate are configured to be interconnected by magnetic attraction.

8. The foldable apparatus according to claim 5, wherein:
the first sliding block comprises a sliding fitting portion, a shielding plate fastening portion, and a rotating connection portion;
the sliding fitting portion is configured to slidably fit the first mounting plate; and
the sliding fitting portion comprises a flat plate shape.

9. The foldable apparatus according to claim 1, wherein:
when the foldable apparatus is in the folded state, the first shielding plate and the second shielding plate are configured to be disposed in a stacked manner; and
at least a part of a rear housing of an electronic device is accommodated in space between the first shielding plate and the second shielding plate.

10. The foldable apparatus according to claim 9, wherein:
the first shielding plate comprises a first part and a second
    part that are adjacent to each other
when the foldable apparatus is in an intermediate state
    during a process of switching between the unfolded
    state and the folded state, the first part is configured to
    be located on a side of an inner surface of the rear
    housing, the second part is configured to be corre-
    spondingly disposed on an outer side of a side edge of
    the rear housing, the first part comprises a first main
    body and a first protrusion that protrudes from a surface
    of the first main body and is configured to be in contact
    with the rear housing, so that a gap is formed between
    the first main body and the rear housing, and the second
    part is connected to the first main body; and
when the foldable apparatus is in the folded state, the
    second part is configured to be located on a side of the
    inner surface of the rear housing, so that a gap is formed
    between the second part and the rear housing.

11. The foldable apparatus according to claim 10, wherein
a groove is disposed at a joint between the first main body
and the first protrusion, and an adhesive material is disposed
on an inner wall of the groove.

12. The foldable apparatus according to claim 9, wherein:
the first shielding plate comprises a first part and a second
    part that are adjacent to each other
when the foldable apparatus is in an intermediate state
    during a process of switching between the unfolded
    state and the folded state, the first part is configured to
    be in contact with an inner surface of the rear housing
    of the electronic device, and the second part is config-
    ured to be located on an outer side of a side edge of the
    rear housing; and
when the foldable apparatus is in the folded state, both the
    first part and the second part are configured to be in
    contact with the inner surface of the rear housing.

13. The foldable apparatus according to claim 1, wherein:
the first shielding plate comprises a first side surface and
    a first inclined surface, the first side surface is inter-
    connected to the second shielding plate, the first
    inclined surface is connected between the first side
    surface and a first inner surface of the first shielding
    plate; and
when the foldable apparatus is in the unfolded state, a
    distance between the first inclined surface and the hinge
    is configured to be greater than a distance between the
    first inner surface and the hinge.

14. An electronic device, comprising a flexible display, a
rear housing, and a foldable apparatus, wherein the flexible
display and the rear housing are separately assembled on
two opposite sides of the foldable apparatus, and the fold-
able apparatus comprises:
    a first mounting plate, a second mounting plate, and a
        hinge, wherein the hinge is rotatably connected to the
        first mounting plate, a central axis around which the
        hinge and the first mounting plate rotate relative to each
        other is located at a first axis, the hinge is rotatably
        connected to the second mounting plate, and a central
        axis around which the hinge and the second mounting
        plate rotate relative to each other is located at a second
        axis;
    a first shielding plate and a first rotating arm, wherein the
        first shielding plate is slidably connected to the first
        mounting plate, the first rotating arm is rotatably con-
        nected to the hinge, a central axis around which the first rotating arm and the hinge rotate relative to each other
    is located at a third axis, the third axis and the first axis
    are non-collinear, the first shielding plate is movably
    connected to the first rotating arm, and the first shield-
    ing plate is configured to slide relative to the first
    mounting plate when the first rotating arm rotates
    relative to the hinge; and
a second shielding plate and a second rotating arm,
    wherein the second shielding plate is slidably con-
    nected to the second mounting plate, the second rotat-
    ing arm is rotatably connected to the hinge, a central
    axis around which the second rotating arm and the
    hinge rotate relative to each other is located at a fourth
    axis, the fourth axis and the second axis are non-
    collinear, the second shielding plate is movably con-
    nected to the second rotating arm, and in a process in
    which the second rotating arm rotates relative to the
    hinge, the second shielding plate slides relative to the
    second mounting plate, wherein
when the foldable apparatus is in an unfolded state, the
    first shielding plate and the second shielding plate are
    configured to be interconnected; and
when the foldable apparatus is in a folded state:
    the first shielding plate and the second shielding plate
        are configured to be disposed between the first
        mounting plate and the second mounting plate in a
        stacked manner, and
    the flexible display is configured to be located on an
        outer side of the foldable apparatus.

15. The electronic device according to claim 14, wherein
the first shielding plate comprises a first inner surface and a
first outer surface disposed opposite to each other, the first
inner surface faces the first rotating arm, and the third axis
is located on the first outer surface or on a side of the first
outer surface facing away from the first inner surface.

16. The electronic device according to claim 14, wherein
the first rotating arm is rotatably connected to the first
shielding plate, or the first rotating arm is slidably connected
to the first shielding plate.

17. The electronic device according to claim 14, wherein
the first rotating arm comprises a first arc-shaped arm, the
first arc-shaped arm fits the hinge for a rotating connection
between the first rotating arm and the hinge, and the third
axis is an arc center of the first arc-shaped arm.

18. The electronic device according to claim 14, further
comprising a first sliding block, wherein the first shielding
plate is slidably connected to the first mounting plate
through the first sliding block, the first shielding plate is
rotatably connected to the first rotating arm through the first
sliding block, and the first shielding plate and the first sliding
block have a detachable connection relationship.

19. The electronic device according to claim 18, further
comprising a first fastening plate fastened to the first sliding
block, wherein the first shielding plate and the first fastening
plate have a detachable connection relationship, and an area
of a surface of the first fastening plate that is connected to
the first shielding plate is greater than an area of a surface of
the first sliding block that faces the first shielding plate.

20. The electronic device according to claim 19, wherein
the first fastening plate is connected to the first shielding
plate by magnetic attraction, and when the foldable appa-
ratus is in the unfolded state, the first shielding plate and the
second shielding plate are configured to be interconnected
by magnetic attraction.

* * * * *